(12) United States Patent
Morishita et al.

(10) Patent No.: US 10,815,352 B2
(45) Date of Patent: Oct. 27, 2020

(54) MOLDED FOAM BODY, DAM RUBBER, COMPOSITE BODY OF DAM RUBBER AND PANEL, AND METHOD FOR INCREASING SOUND TRANSMISSION LOSS

(71) Applicant: KURARAY CO., LTD., Kurashiki-shi (JP)

(72) Inventors: Yoshihiro Morishita, Kamisu (JP); Masahiro Kato, Kamisu (JP); Yasushi Senda, Kamisu (JP); Hiroyuki Arishima, Kurashiki (JP); Jun Koishikawa, Chiyoda-ku (JP)

(73) Assignee: KURARAY CO., LTD., Kurashiki-shi (JP)

(*) Notice: Subject to any disclaimer, the term of this patent is extended or adjusted under 35 U.S.C. 154(b) by 59 days.

(21) Appl. No.: 16/301,638

(22) PCT Filed: May 17, 2017

(86) PCT No.: PCT/JP2017/018595
§ 371 (c)(1),
(2) Date: Nov. 14, 2018

(87) PCT Pub. No.: WO2017/200026
PCT Pub. Date: Nov. 23, 2017

(65) Prior Publication Data
US 2019/0284362 A1    Sep. 19, 2019

(30) Foreign Application Priority Data

May 18, 2016 (JP) ................................ 2016-100001

(51) Int. Cl.
| | |
|---|---|
| C08J 9/00 | (2006.01) |
| C08L 23/08 | (2006.01) |
| C08L 23/16 | (2006.01) |
| C08L 53/02 | (2006.01) |
| C08L 23/04 | (2006.01) |
| C08L 9/06 | (2006.01) |
| C08J 9/04 | (2006.01) |
| C08J 9/10 | (2006.01) |
| B29D 99/00 | (2010.01) |
| B60J 10/70 | (2016.01) |
| C08F 297/04 | (2006.01) |

(52) U.S. Cl.
CPC .......... *C08J 9/103* (2013.01); *B29D 99/0053* (2013.01); *C08J 9/0033* (2013.01); *C08J 9/0061* (2013.01); *C08J 9/04* (2013.01); *C08J 9/105* (2013.01); *C08J 9/106* (2013.01); *C08J 9/107* (2013.01); *C08L 9/06* (2013.01); *C08L 23/04* (2013.01); *C08L 23/0853* (2013.01); *C08L 23/16* (2013.01); *C08L 53/02* (2013.01); *C08L 53/025* (2013.01); *B60J 10/70* (2016.02); *C08F 297/04* (2013.01); *C08J 2205/06* (2013.01); *C08J 2309/06* (2013.01); *C08J 2423/08* (2013.01); *C08J 2423/16* (2013.01)

(58) Field of Classification Search
CPC .... C08L 23/16; C08L 23/0853; C08L 53/025; C08L 53/02; C08J 2205/06
See application file for complete search history.

(56) References Cited

U.S. PATENT DOCUMENTS

| | | |
|---|---|---|
| 2004/0039128 A1 | 2/2004 | Sasagawa et al. |
| 2005/0119414 A1 | 6/2005 | Sasagawa et al. |
| 2005/0234193 A1 | 10/2005 | Sasagawa et al. |

(Continued)

FOREIGN PATENT DOCUMENTS

| | | |
|---|---|---|
| JP | 2003-306567 A | 10/2003 |
| WO | WO 03/035705 A1 | 5/2003 |

(Continued)

OTHER PUBLICATIONS

International Search Report dated Aug. 22, 2017 in PCT/JP2017/018595, citing documents AA-AG, AO-AR, AX and AY therein, 2 pages.

(Continued)

*Primary Examiner* — Jeffrey C Mullis
(74) *Attorney, Agent, or Firm* — Oblon, McClelland, Maier & Neustadt, L.L.P.

(57) ABSTRACT

Provided are a foam molded body capable of improving damping properties and sound insulation properties of a panel and realizing weight reduction of a panel, a dam rubber, a complex of a dam rubber and a panel, and a method for increasing a sound transmission loss.

The present invention is concerned with a foam molded body of a resin composition containing a block copolymer (I) which is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight determined in terms of standard polystyrene by gel permeation chromatography of 30,000 to 500,000; at least one olefin-based polymer (II) selected from the group consisting of an ethylene-propylene-diene copolymer rubber, an ethylene-vinyl acetate copolymer, and a polyethylene-based resin; a crosslinking agent (III); and a foaming agent (IV).

15 Claims, 5 Drawing Sheets

(56) References Cited

U.S. PATENT DOCUMENTS

| | | | |
|---|---|---|---|
| 2006/0205890 A1 | 9/2006 | Sasagawa et al. | |
| 2008/0188580 A1 | 8/2008 | Sasagawa et al. | |
| 2008/0194716 A1 | 8/2008 | Sasagawa et al. | |
| 2009/0312449 A1* | 12/2009 | Sasaki | A43B 3/00 521/148 |
| 2012/0190786 A1 | 7/2012 | Sasaki | |
| 2012/0322905 A1* | 12/2012 | Kusanose | C08J 9/0042 521/139 |
| 2014/0102930 A1 | 4/2014 | Sasaki | |
| 2017/0145688 A1* | 5/2017 | Caimi | E04B 2/7403 |
| 2019/0218389 A1* | 7/2019 | Senda | C08L 53/02 |
| 2020/0024441 A1* | 1/2020 | Senda | C08L 45/02 |

FOREIGN PATENT DOCUMENTS

| | | |
|---|---|---|
| WO | WO 2004/003027 A1 | 1/2004 |
| WO | WO 2009/072503 A1 | 6/2009 |
| WO | WO 2010/064574 A1 | 6/2010 |
| WO | WO 2011/040586 A1 | 4/2011 |
| WO | WO 2012/102339 A1 | 8/2012 |

OTHER PUBLICATIONS

Masao Ishii, "Characteristics and Applications of Styrenic Block Copolymers", Journal of the Society of Rubber Industry, 1997, vol. 70, No. 12, 1997, pp. 707-714.

Kimihiro Kubo, "Application of Styrenic Thermoplastic Elastomer(TPS)", Journal of the Society of Rubber Industry, 2013, vol. 86, No. 10, 2013, pp. 309-314.

Extended European Search Report dated Nov. 22, 2019 in European Patent Application No. 17799450.6, citing document AA therein, 8 pages.

* cited by examiner

MOLDED FOAM BODY, DAM RUBBER, COMPOSITE BODY OF DAM RUBBER AND PANEL, AND METHOD FOR INCREASING SOUND TRANSMISSION LOSS

TECHNICAL FIELD

The present invention relates to a foam molded body, a dam rubber, a complex of a dam rubber and a panel, and a method for increasing a sound transmission loss.

BACKGROUND ART

An olefin-based polymer, such as an ethylene-propylene-diene copolymer rubber (EPDM), an ethylene-vinyl acetate copolymer, and a polyethylene-based resin, does not have a double bond in a main chain of a molecular structure thereof, and therefore, it is excellent in heat-aging resistance, weather resistance, and so on, as compared with general-purpose conjugated diene rubbers. The olefin-based polymer is used for various industrial sealing materials, encapsulating/casting materials, adhesives, anti-vibration/damping/soundproof/base-isolating materials, and so on. In addition, a foam molded body using an olefin-based polymer is used for components for transportation equipment, such as automobile components, electrical components, materials for building and construction, industrial components, and so on.

Examples of the components for transportation equipment, such as automobile components, include exterior parts, such as a weather strip sponge, a glass run channel, and a dam rubber. In the case of using a foam molded body as such an exterior part for transportation equipment, improvement of processability, such as extrusion processability of a single member or extrusion processability with other member, maintenance of mechanical properties, such as slidability, weight reduction, and the like are required, in addition to various performances, such as damping properties and sound insulation properties.

Here, in order to remove kneading troubles and extrusion troubles, as highly foamed sponge materials to be used for a heat-insulating sponge, a dam rubber, and so on, PTL 1 describes a copolymer rubber containing structural units derived from ethylene [A], an α-olefin [B] having 3 to 20 carbon atoms, a non-conjugated polyene [C] having one double bond between adjacent carbon atoms in one molecule, the double bond being capable of polymerization by a metallocene-based catalyst, and a non-conjugated polyene [D] having two of the above double bonds in one molecule, wherein an intrinsic viscosity [η] and a long-chain branch derived from the component [D] fall within specified ranges.

In addition, in order to not only improve kneading processability but also satisfy sufficient foamability as materials of automobile exterior parts, such as a glass run channel and a weather strip, PTL 2 describes a copolymer (A) containing structural units derived from ethylene [A], an α-olefin [B] having 3 to 20 carbon atoms, a non-conjugated polyene [C-1], in which among carbon-carbon double bonds, only one carbon-carbon double bond polymerizable with a metallocene catalyst is present in one molecule, and a non-conjugated polyene [C-2], in which among the carbon-carbon double bonds, two carbon-carbon double bonds polymerizable with the metallocene catalyst are present in one molecule, wherein as for physical properties, a Mooney viscosity measured at 100° C. and activation energy of fluidization [kJ/mol] fall within specified ranges.

In addition, in order to solve risks of handling and operation to be caused due to a foaming agent used for the purpose of weight reduction, as materials, such as a weather strip sponge for automobile, PTL 3 discloses a rubber composition containing a foaming agent (II) formed from at least (A) a polymer compound having a saturated water absorption of 10 to 1,000 g/g in ion-exchanged water (25° C.) and (B) water, wherein a storage modulus (G') of the agent, determined on the basis of the viscoelasticity measurement at a temperature of 20° C., is $8.0 \times 10^1$ to $1.0 \times 10^8$ Pa at a frequency of 5 rad/s; and a rubber component selected from a natural rubber and a synthetic rubber, or an ethylene/α-olefin/non-conjugated polyethylene random copolymer (I-1).

CITATION LIST

Patent Literature

PTL 1: WO 2009/072503 A
PTL 2: WO 2010/064574 A
PTL 3: WO 2012/102339 A

SUMMARY OF INVENTION

Technical Problem

As for the copolymer-containing rubber compositions disclosed in PTLs 1 to 3, the requirements, such as improvement of kneading processability and weight reduction have been improved. However, in order that they may be used as materials for components for transportation equipment, such as automobile components, further improvements in various performances, such as damping properties, sound insulation properties, gas venting properties, and adhesiveness, and besides, further improvements in processability and weight reduction, maintenance of mechanical properties, such as breaking strength, and so on are required.

Then, a problem of the present invention is to provide a foam molded body capable of improving damping properties and sound insulation properties of a panel and realizing weight reduction of a panel, a dam rubber, a complex of a dam rubber and a panel, and a method for increasing a sound transmission loss.

Solution to Problem

In order to solve the aforementioned problem, the present inventors made extensive and intensive investigations. As a result, it has become clear that the aforementioned problem may be solved by a foam molded body, which is molded from a resin composition containing a block copolymer (I) which is a block copolymer having a polymer block (A) composed mainly of a structural unit derived from an aromatic vinyl compound and other polymer block (B), exhibits a peak top temperature of tan δ, as measured under a specified condition, of −50 to 50° C., and has a peak top molecular weight, as determined in terms of standard polystyrene by gel permeation chromatography, of 30,000 to 500,000, an olefin-based polymer (II), a crosslinking agent (III), and a foaming agent (IV), thereby leading to the present invention.

The present invention is concerned with the following [1] to [11].

[1] A foam molded body, which is molded from a resin composition containing a block copolymer (I) which is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000, at least one olefin-based polymer (II) selected from the group consisting of an ethylene-propylene-diene copolymer rubber, an ethylene-vinyl acetate copolymer, and a polyethylene-based resin, a crosslinking agent (III), and a foaming agent (IV).

[2] The foam molded body as set forth in the above [1], wherein the polymer block (B) is composed mainly of a structural unit derived from a conjugated diene compound and has a total content of a 3,4-bond unit and a 1,2-bond unit of 20 mol % or more.

[3] The foam molded body as set forth in the above [2], wherein the structural unit derived from a conjugated diene compound is a structural unit derived from at least one selected from the group consisting of isoprene and butadiene.

[4] The foam molded body as set forth in the above [1], wherein when the polymer block (B) is regarded as having a structure with a hydrogenation rate of 100 mol %, an average value of a methylene chain length of a main chain of a structural unit derived from at least one selected from the group consisting a conjugated diene compound and isobutylene is from 1.0 to 6.0.

[5] The foam molded body as set forth in the above [2] or [3], wherein when the polymer block (B) is regarded as having a structure with a hydrogenation rate of 100 mol %, an average value of a methylene chain length of a main chain of a structural unit derived from at least one selected from a conjugated diene compound is from 1.0 to 6.0.

[6] The foam molded body as set forth in any of the above [1] to [5], wherein the polymer block (B) contains a structural unit derived from an aliphatic hydrocarbon having a carbon-carbon double bond, and a hydrogenation rate of the carbon-carbon double bond in the total polymer blocks (B) is 70 mol % or more.

[7] A dam rubber including the foam molded body as set forth in any of the above [1] to [6].

[8] The dam rubber as set forth in the above [7], which is for transportation equipment or building.

[9] A complex including the dam rubber as set forth in the above [7] or [8] and a panel.

[10] The complex as set forth in the above [9], wherein the panel is made of a glass, a metal, or a plastic.

[11] A method for increasing a sound transmission loss, including installing, in a panel, a foam molded body, which is molded from a resin composition containing:

a block copolymer (I) which is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000, at least one olefin-based polymer (II) selected from the group consisting of an ethylene-propylene-diene copolymer rubber, an ethylene-vinyl acetate copolymer, and a polyethylene-based resin, a crosslinking agent (III), and a foaming agent (Iv).

Advantageous Effects of Invention

In accordance with the present invention, it is possible to provide a foam molded body, a dam rubber, a complex of a dam rubber and a panel, and a method for increasing a sound transmission loss, which are capable of improving damping properties and sound insulation properties of a panel and realizing weight reduction of a panel.

DESCRIPTION OF EMBODIMENTS

[Foamed Molded Body]

Figure 1:
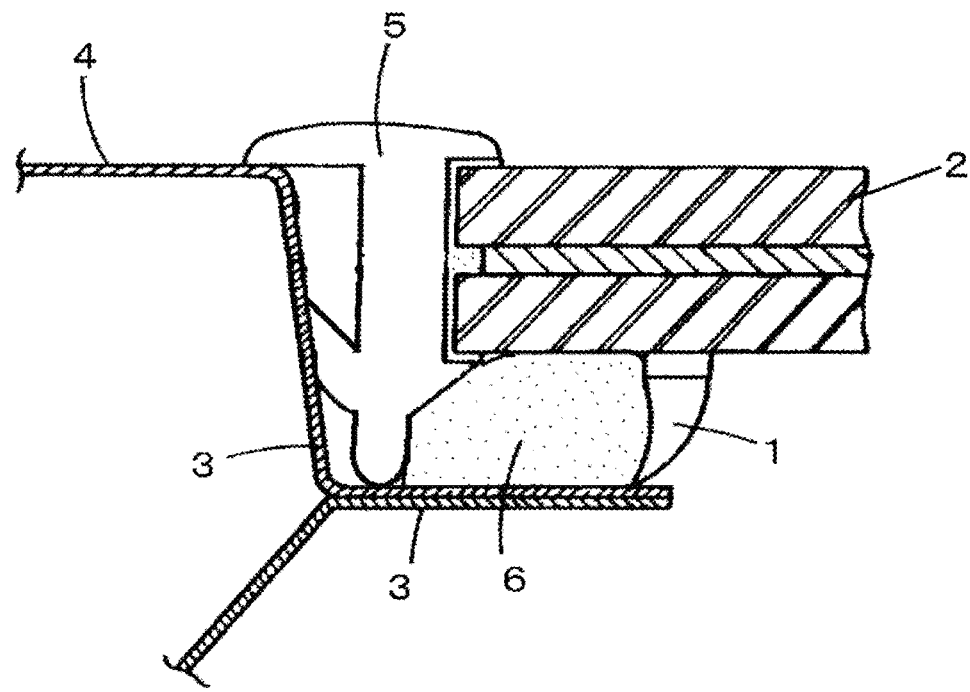
FIG. 1 is a view of an outline of a structure of mounting a panel in a window frame of transportation equipment, such as an automobile.

The present invention is concerned with a foam molded body, which is molded from a resin composition containing:

a block copolymer (I) which is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000, at least one olefin-based polymer (II) selected from the group consisting of an ethylene-propylene-diene copolymer rubber, an ethylene-vinyl acetate copolymer, and a polyethylene-based resin, a crosslinking agent (III), and a foaming agent (IV).

Each of the components of the resin composition and the foam molded body are hereunder described in detail.

(Block Copolymer (I))

The block copolymer (I) is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000.

(Polymer Block (A))

The polymer block (A) of the block copolymer (I) is composed mainly of a structural unit derived from an aromatic vinyl compound (hereinafter sometimes abbreviated as "aromatic vinyl compound unit"). Here, the wording "mainly" indicates the matter that the aromatic vinyl compound unit is contained in an amount of 50% by mass or more on the basis of the mass of the polymer block (A). The content of the aromatic vinyl compound unit in the polymer block (A) is preferably 70% by mass or more, more preferably 90% by mass or more, and especially preferably 95% by mass or more on the basis of the total mass of the polymer block (A), and it may also be substantially 100% by mass.

Examples of the aromatic vinyl compound that is a raw material constituting the polymer block (A) include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a styrene derivative substituted with a silyl group, indene, and vinylnaphthalene. These aromatic vinyl compounds may be used alone or may be used in combination of two or more thereof. Above all, from the viewpoint of production costs and balance in physical properties, styrene, α-methylstyrene, and a mixture thereof are preferred, with styrene being more preferred.

However, the polymer block (A) may contain a structural unit derived from an unsaturated monomer other than the aromatic vinyl compound (hereinafter sometimes abbreviated as "other unsaturated monomer unit") so long as the object and effects of the present invention are not impaired. As the other unsaturated monomer, for example, at least one selected from the group consisting of butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-menthene, dipentene, methylene norbornene, and 2-methylenetetrahydrofuran is exemplified. The bonding mode in the case where the polymer block (A) contains the other unsaturated monomer unit is not particularly limited, and may be either random or tapered.

The content of the other unsaturated monomer is preferably 10% by mass or less, and more preferably 8% by mass or less, and preferably 0.1% by mass or more on the basis of the total mass of the polymer block (A).

The block copolymer (I) may have at least one of the aforementioned polymer block (A). In the case where the block copolymer (I) has two or more of the polymer block (A), those polymer blocks (A) may be the same as or different from each other. In this specification, the wording "polymer blocks are different" means that at least one of the monomer unit constituting the polymer block, the peak top molecular weight, the weight average molecular weight, the number average molecular weight, the molecular weight distribution, and the stereoregularity, and in the case where the block contains plural monomer units, the ratio of the respective monomer units and the copolymerization mode (random, gradient, or block) is different.

The peak top molecular weight of the aforementioned polymer block (A) which the block copolymer (I) has is not particularly limited, and the peak top weight molecular weight (Mp) of at least one polymer block (A) among the aforementioned polymer blocks (A) which the block copolymer (I) has is preferably 3,000 to 60,000, more preferably 3,000 to 30,000, still more preferably 3,000 to 15,000, and most preferably 3,000 to 12,000. When the block copolymer (I) has at least one polymer block (A) having a peak top molecular weight (Mp) falling within the aforementioned range, the mechanical strength of the resin composition containing the block copolymer (I) is more improved, and the damping properties and the sound insulation properties are excellent, too.

In the block copolymer (I), from the viewpoint of decreasing the molding temperature, the peak top molecular weight of at least one polymer block (A) among the aforementioned polymer blocks (A) which the block copolymer (I) has is preferably 300 to 2,500, more preferably 300 to 2,000, and still more preferably 300 to 1,200.

Furthermore, from the viewpoint of mechanical strength and from the viewpoint of not only decreasing the molding temperature but also holding a fixed melt tension at the time of molding, the block copolymer (I) preferably may have both a polymer block (A) having a peak top molecular weight of 3,000 to 15,000 (preferably 3,000 to 6,000) and a polymer block (A) having a peak top molecular weight of 300 to 2,500 (preferably 1,300 to 2,500), and may have each one at the molecular terminal of triblocks.

From the viewpoint of mechanical strength, pressure-sensitive adhesiveness, and adhesiveness, the peak top molecular weight (Mp) of the total of the aforementioned polymer blocks (A) is preferably 3,300 to 120,000, more preferably 4,500 to 60,000, still more preferably 4,500 to 30,000, and especially preferably 5,000 to 20,000.

From the viewpoint of a balance among moldability, flexibility, mechanical strength, damping properties, sound insulation properties, and so on, the block copolymer (I) may contain two or more block copolymers in which the peak top molecular weight (Mp) of the aforementioned polymer block (A) is preferably 3,000 to 60,000, more preferably 3,000 to 30,000, still more preferably 3,000 to 15,000, and most preferably 3,000 to 12,000; and a block copolymer in which the peak top molecular weight (Mp) of the total of the aforementioned polymer blocks (A) is 13,000 to 20,000 and a block copolymer in which the peak top molecular weight of the total of the aforementioned polymer blocks (A) is 5,000 to 12,000 may also be used in combination.

In the case where the block copolymer (I) contains two or more polymer blocks (A1) and (A2), the peak top molecular weight of the total of the polymer blocks (A) means a peak top molecular weight (Mp) of a sum total thereof, and in the case where the block copolymer (I) contains only one polymer block (A), the peak top molecular weight of the total of the polymer blocks (A) means a peak top molecular weight of that polymer block (A). When the peak top molecular weight of the total of the aforementioned polymer blocks (A) which the block copolymer (I) has falls within the aforementioned range, the mechanical strength of the resulting block copolymer (I) is more improved.

The "peak top molecular weight" described in this specification and the claims is everywhere a peak top molecular weight expressed in terms of standard polystyrene as determined through gel permeation chromatography (GPC), and in more detail, it is a value measured according to the method described in the section of Examples. The peak top molecular weight of each of the polymer blocks (A) which the block copolymer has can be determined by measuring the liquid sampled every time after the polymerization of each polymer block in the production process. For example, in the case of synthesizing a triblock copolymer having a structure of A1-B-A2 by successively polymerizing A1, B, and A2 in order, the peak top molecular weight of the first polymer block A1 can be determined by subjecting the liquid sampled after the polymerization of A1 to the GPC measurement. In addition, the peak top molecular weight of the polymer block B can be determined by determining the peak top molecular weight of a diblock copolymer of the structure of A1-B by subjecting the liquid sampled after the polymerization of B to the GPC measurement and then subtracting the peak top molecular weight of the polymer block A1 from that value. Furthermore, the peak top molecular weight of the polymer block A2 can be determined by determining the peak top molecular weight of a triblock copolymer of the structure of A1-B-A2 by subjecting the liquid sampled after the polymerization of A2 to the GPC measurement and then subtracting the peak top molecular weight of the diblock copolymer having a structure of A1-B from that value.

As another method, in the case of a triblock copolymer having a structure of A1-B-A2, by calculating the peak top molecular weight of the total of the polymer blocks (A) from the peak top molecular weight of the block copolymer (I) and the total content of the polymer block (A) as confirmed through the $^1$H-NMR measurement, calculating the peak top molecular weight of the deactivated first polymer block A1 through the GPC measurement, and then subtracting it, the peak top molecular weight of the second polymer block A2 can be determined, too.

In the block copolymer (I) of the present invention, the content of the aforementioned polymer block (A) (in the case where the block copolymer (I) has plural polymer blocks (A), the total content thereof is referred to herein) is not particularly limited, and for example, it is preferably 1% by mass or more and 70% by mass or less, and more preferably 1% by mass or more and 60% by mass or less relative to the total amount of the block copolymer (I). When the content of the polymer block (A) falls within the aforementioned range, the resulting block copolymer (I) becomes more excellent in flexibility, damping properties, and sound insulation properties. The content of the polymer block (A) is still more preferably 2% by mass or more and 50% by mass or less, yet still more preferably 2% by mass or more and 40% by mass or less, especially preferably 2% by mass or more and 30% by mass or less, and most preferably 2% by mass or more and 25% by mass or less.

The content of the polymer block (A) in the block copolymer (I) is a value determined through the $^1$H-NMR spectrometry, and in more detail, it is a value measured according to the method described in the section of Examples.

(Polymer Block (B))

The polymer block (B) which the block copolymer (I) has is not particularly limited so long as it is a polymer block other than the polymer block (A), and it preferably contains a structural unit derived from an aliphatic hydrocarbon having a carbon-carbon double bond. Though the structural unit derived from an aliphatic hydrocarbon having a carbon-carbon double bond is not particularly limited, examples thereof include aliphatic olefin compounds, such as ethylene, propylene, 1-butene, isobutylene, 2-methyl-1-butene, 3-methyl-1-butene, 1-pentene, 1-hexene, cyclohexene, 4-methyl-1-pentene, vinylcyclohexene, 1-octene, 1-decene, 1-tetradecene, 1-octadecene, pinene, and norbornene; and conjugated diene compounds, such as isoprene, butadiene, 1,3-hexadiene, 2,3-dimethyl-1,3-butadiene, 1,3-pentadiene, cyclopentadiene, 1,3-cyclohexadiene, and myrcene. Above all, the polymer block (B) is preferably one composed mainly of a structural unit derived from a conjugated diene compound, and the conjugated diene compound is more preferably one composed of a structural unit derived from at least one selected from the group consisting of isoprene and butadiene. The block copolymer (B) may have only a structural unit derived from one kind or may have a structural unit derived from two or more kinds. In the case where the polymer block (B) has two or more structural units, the bonding mode thereof can be random, tapered, or partially block, or may be in the form of a combination of two or more thereof.

It is preferred that the polymer block (B) is composed mainly of a structural unit derived from isoprene (hereinafter sometimes abbreviated as "isoprene unit"), a structural unit derived from butadiene (hereinafter sometimes abbreviated as "butadiene unit"), or a structural unit derived from a mixture of isoprene and butadiene (hereinafter sometimes abbreviated as "isoprene and butadiene unit"). Here, the wording "mainly" indicates the matter that the aforementioned structural unit is contained in an amount of 50% by mass or more on the basis of the total mass of the polymer block (B). The content of the structural unit derived from isoprene and/or butadiene in the polymer block (B) is preferably 70% by mass or more, more preferably 80% by mass or more, still more preferably 90% by mass or more, and especially preferably 95% by mass or more on the basis of the total mass of the polymer block (B), and it may also be substantially 100% by mass.

The polymer block (B) may contain, as a structural unit derived from a conjugated diene compound other than isoprene and butadiene, a structural unit derived from at least one selected from 1,3-hexadiene, 2,3-dimethyl-1,3-butadiene, 1,3-pentadiene, cyclopentadiene, 1,3-cyclohexadiene, and myrcene.

As mentioned above, though the polymer block (B) is composed mainly of an isoprene unit, a butadiene unit, or an isoprene and butadiene unit, the case where the polymer block (B) is composed mainly of a butadiene unit or an isoprene and butadiene unit is preferred from the standpoint that the resin composition containing the block copolymer (I) is excellent in mechanical strength (particularly rubber elasticity). Furthermore, the case where the polymer block (B) is constituted mainly of an isoprene and butadiene unit is more preferred from the standpoint that in a resin composition of a hydrogenated block copolymer (I) as mentioned later and an olefin-based resin (II) as mentioned later, the compatibility is favorable. Though a mixing proportion of isoprene and butadiene is not particularly limited, from the viewpoint of improvements in various performances, a mixing ratio thereof [isoprene/butadiene] (mass ratio) is preferably 10/90 to 90/10, more preferably 20/80 to 80/20, still more preferably 30/70 to 70/30, and especially preferably 40/60 to 60/40. In addition, in the case where the polymer block (B) is constituted mainly of an isoprene and butadiene unit, the bonding mode thereof is not particularly limited and can be random, tapered, completely alternate, partially block, or block, or may be in the form of a combination of two or more thereof.

As for the bonding modes of isoprene and butadiene each constituting the polymer block (B), in the case of butadiene, the 1,2-bond and the 1,4-bond can be taken, and in the case of isoprene, the 1,2-bond, the 3,4-bond, and the 1,4-bond can be taken. In the block copolymer (I) of the present invention, the total of the contents of the 3,4-bond unit and the 1,2-bond unit in the polymer block (B) is preferably 20 mol % or more. When the total of the contents of the 3,4-bond unit and the 1,2-bond unit in the polymer block (B) is 20 mol % or more, in the resin composition, the compatibility between the block copolymer (I) and an olefin-based polymer (II) as mentioned later becomes sufficient, and in the case where transparency is required without losing an flexibilization effect, the transparency is also kept. In addition, in the case of fabricating a foam molded body, cross-linking readily takes place between the block copolymer (I) and the olefin-based polymer (II), and a scattering in the foaming size can be reduced. In addition, in the block copolymer (I) of the present invention, though there is no particular limitation, the total of the contents of the 3,4-bond unit and the 1,2-bond unit in the polymer block (B) is preferably 90 mol % or less, and when it falls within this range, a glass transition temperature (Tg) of the resulting block copolymer (I) does not become excessively high, and the flexibility of the foam molded body using the resin composition containing the block copolymer (I) can be held.

In the case where the polymer block (B) is composed only of butadiene, the aforementioned wording "the total of the contents of the 3,4-bond unit and the 1,2-bond unit is 20 mol % or more" is replaced with the wording "the content of the 1,2-bond unit is 20 mol % or more" and applied.

The total of the contents of the 3,4-bond unit and the 1,2-bond unit in the polymer block (B) is preferably 20 mol% or more, and from the viewpoint of providing high damping properties, it is more preferably 30 to 90 mol%, still more preferably 40 to 85 mol%, especially preferably 50 to 85 mol%, and most preferably 55 to 85 mol%. The content of each of the 3,4-bond unit and the 1,2-bond unit is a value calculated through the $^1$H-NMR measurement according to the method described in the section of Examples.

In this specification, in the case where the polymer block (B) contains an isoprene unit, the total of the contents of the 3,4-bond unit and the 1,2-bond unit may be occasionally referred to as the vinyl bond content, and in the case where the polymer block (B) is composed of a butadiene unit, the content of the 1,2-bond unit may be occasionally referred to as the vinyl bond content.

(Average Value of Methylene Chain Length of Polymer Block (B))

When the polymer block (B) is regarded as having a structure with a hydrogenation rate of 100 mol %, an average value of a methylene chain length (hereinafter sometimes referred to as "average methylene chain length") of a main chain of the structural unit derived from at least one selected from the group consisting of a conjugated diene compound and isobutylene is preferably 1.0 to 6.0. Here, the methylene chain length expresses to what extent the methylene group represented by —CH$_2$— continuously bonds.

In particular, in the case where the polymer block (B) is hydrogenated, when the average methylene chain length is more than 6.0, crystallization is liable to occur, the damping properties are lowered, and the sound insulation properties are lowered. From the same viewpoint, the average methylene chain length is more preferably 1.0 to 5.0, still more preferably 1.0 to 4.0, yet still more preferably 1.0 to 3.5, even yet still more preferably 1.3 to 3.0, especially preferably 1.3 to 2.5, and most preferably 1.5 to 2.2.

The average methylene chain length is hereunder described while expressing the structures.

[Chem. 1]

(i) Case where isoprene is connected through 1,4-bond:

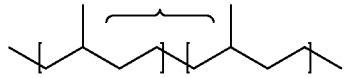

Average methylene chain length = 3

(ii) Case where 1,2-bond and 1,4-bond of butadiene are equally connected:

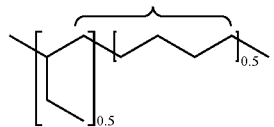

Average methylene chain length = 5

(iii) Case where 1,2-bond and 1-4-bond of butadiene are connected in a molar ratio of 4/6:

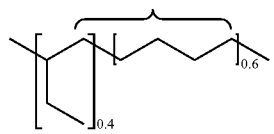

Average methylene chain length = 7

(iv) Case of isobutylene:

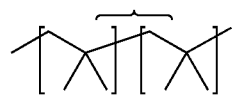

Average methylene chain length = 1

Calculation is made taking into account how much butadiene with 1,4-bond is connected relative to one butadiene with 1,2-bond, as mentioned below.

$$1 + 4 \times \frac{0.6}{0.4} = 7$$

(Average Value of Substituent Constant (v) of Side Chain which Main Chain has Per Ethylene Unit in Polymer Block (B))

When the polymer block (B) is regarded as having a structure with a hydrogenation rate of 100 mol %, an average value of a substituent constant (v) (hereinafter sometimes referred to "average substituent constant") of a side chain which the main chain has per ethylene unit is preferably 0.25 to 1.1. Here, the average substituent constant of a side chain which the main chain has per ethylene unit expresses an average value of bulkiness of the substituent serving as a side chain, and with respect to the substituent constant (v), "Journal of the American Chemical Society" (1975), Vol. 97, pp. 1552-1556 can be made by reference. In particular, in the case where the polymer block (B) is hydrogenated, when the average substituent constant is 0.25 or more, not only the damping properties become high, but also the sound insulation properties become high, and when it is 1.1 or less, the generation of rigidity of the main chain can be suppressed, the damping properties become high, and the sound insulation properties become high. From the same viewpoint, the average substituent constant is more preferably 0.30 to 0.55, still more preferably 0.33 to 0.55, and especially preferably 0.33 to 0.50.

With respect to the substituent constant (v), though specific examples thereof are shown in the following Table 1, besides, values described in "Journal of the American Chemical Society" (1975), Vol. 97, pp. 1552-1556 and "Journal of Organic Chemistry" (1976), Vol. 41, pp. 2217-2220 can be utilized.

TABLE 1

| Substituent of side chain | Substituent constant (v) |
| --- | --- |
| H | 0 |
| Methyl group | 0.52 |
| t-Butyl group | 1.24 |
| Ethyl group | 0.56 |
| n-Propyl group | 0.68 |
| Isopropyl group | 0.76 |
| n-Butyl group | 0.68 |
| s-Butyl group | 1.02 |
| Phenyl group | 0.57 |

The average substituent constant is determined by calculating an average value of the substituent constant (v) of each side chain. For example, in the case where the aforementioned conjugated diene compound is isoprene, and the content ratio of the 1,4-bond unit and the 3,4-bond unit is 40/60 (molar ratio), the average substituent constant is 0.47 and can be determined as follows.

[Chem. 2]

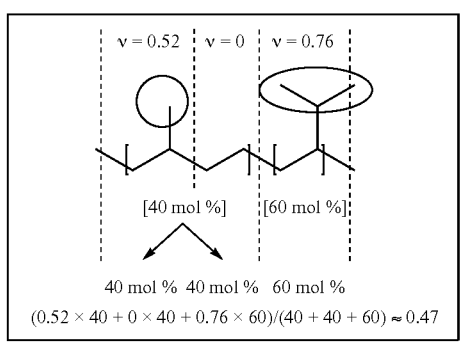

In addition, in the case where the aforementioned conjugated diene compound is butadiene, and the content ratio of the 1,4-bond unit and the 1,2-bond unit is 23/77 (molar ratio), the average substituent constant is 0.35 and can be determined as follows.

[Chem. 3]

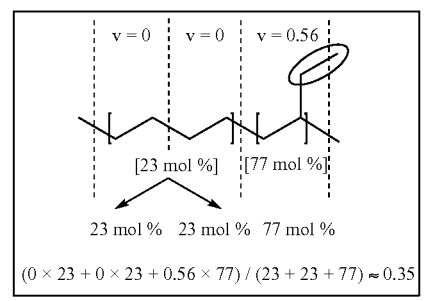

In addition, in the case where the aforementioned conjugated diene compound is a mixture of isoprene and butadiene (molar ratio: 50/50), the content ratio of the 1,4-bond unit and the 3,4-bond unit in isoprene is 40/60 (molar ratio), and the content ratio of the 1,4-bond unit and the 1,2-bond unit in butadiene is 40/60 (molar ratio), the average substituent constant is 0.36 and can be determined as follows.

[Chem. 4]

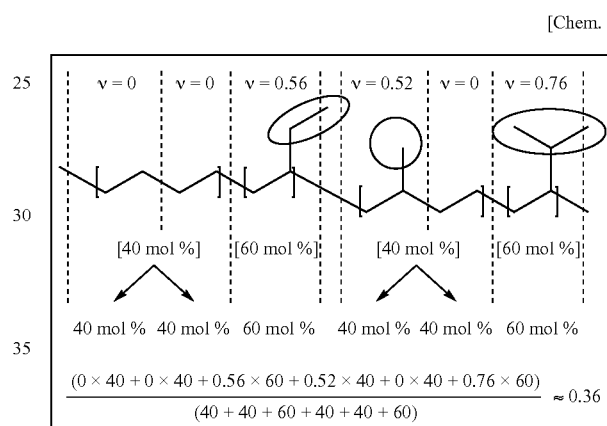

In addition, in the case where the aforementioned conjugated diene compound is mainly isoprene and contains 12 mol % of styrene, and the content ratio of the 1,4-bond unit and the 3,4-bond unit in isoprene is 40/60 (molar ratio), the average substituent constant is 0.48 and can be determined as follows.

[Chem. 5]

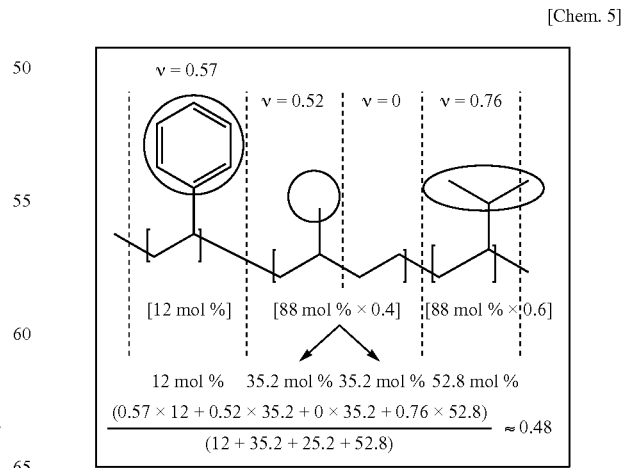

From the viewpoint of damping properties, sound insulation properties, gas venting properties, and so on, the peak top molecular weight (Mp) of the total of the aforementioned polymer blocks (B) which the block copolymer (I) has is preferably 12,000 to 480,000, more preferably 32,000 to 430,000, still more preferably 52,000 to 380,000, and especially preferably 62,000 to 330,000 in the state before the hydrogenation.

The polymer block (B) may contain a structural unit derived from a polymerizable monomer other than the isoprene unit and the butadiene unit so long as the object and effects of the present invention are not impaired. Preferred examples of the other polymerizable monomer include at least one compound selected from the group consisting of aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene; as well as methyl methacrylate, methyl vinyl ether, N-vinylcarbazole, pinene, 8,9-p-menthene, dipentene, methylene norbornene, and 2-methylenetetrahydrofuran. In general, the content of the structural unit derived from the other polymerizable monomer is preferably 30% by mass or less, and more preferably 10% by mass or less on the basis of the total mass of the polymer block (B).

In the case where the polymer block (B) contains a structural unit derived from a polymerizable monomer other than the isoprene unit and the butadiene unit, the bonding mode thereof is not particularly limited, and it may be any of random and tapered ones.

The block copolymer (I) of the present invention may include at least one of the aforementioned polymer block (B). In the case where the block copolymer (I) includes two or more of the polymer block (B), those polymer blocks (B) may be the same as or different from each other.

The block copolymer (I) is preferably one containing a structural unit derived from an aliphatic hydrocarbon having a carbon-carbon double bond in the polymer block (B) from the viewpoint of mechanical properties, such as breaking strength, heat resistance, weather resistance, and compatibility with the olefin-based polymer (II) as mentioned later. The structural unit derived from an aliphatic hydrocarbon having a carbon-carbon double bond may be an unhydrogenated one which is not hydrogenated or may be a hydrogenated one.

In this specification, as for the block copolymer (I), in the case where the polymer block (B) contains a structural unit derived from an aliphatic hydrocarbon having a carbon-carbon double bond, and this carbon-carbon double bond is an unhydrogenated one, such block copolymer (I) is occasionally expressed as a block copolymer (I-N), whereas in the case where the carbon-carbon double bond is a hydrogenated one, such block copolymer (I) is occasionally expressed as a hydrogenated block copolymer (I-H). A hydrogenation rate of the carbon-carbon double bond in the total polymer blocks (B) is preferably 70 mol % or more, more preferably 80 mol % or more, still more preferably 85 mol % or more, and yet still more preferably 90 mol % or more, and it is preferably 99 mol % or less. In the case where the hydrogenation rate of the carbon-carbon double bond which the polymer block (B) has is 70 mol % or more, the heat resistance, the weather resistance, and the compatibility with the olefin-based polymer (II) become favorable without impairing mechanical properties, such as breaking strength, through the hydrogenation.

The hydrogenation rate of the carbon-carbon double bond in the total polymer blocks (B) may be 50 mol % or less, and it is preferably 10 mol % or less, more preferably 5 mol % or less, and still more preferably 3 mol % or less. In the case where the hydrogenation rate of the carbon-carbon double bond which the polymer block (B) has is 10 mol % or less, a foam molded body which is excellent in damping properties, sound insulation properties, gas venting properties, and adhesiveness is capable of realizing the weight reduction and holds mechanical properties, such as breaking strength, is obtained.

The aforementioned hydrogenation rate is a value obtained by calculating the amount of the carbon-carbon double bond in the structural unit derived from the aliphatic hydrocarbon having a carbon-carbon double bond of the polymer block (B) of the hydrogenated block copolymer (I-H) through the $^1$H-NMR spectrometry. In more detail, by performing the $^1$H-NMR spectrometry with respect to the block copolymer (I-H) after the hydrogenation and the unhydrogenated block copolymer (I-N) that is a precursor of the block copolymer (I-H), the hydrogenation rate can be determined from a reduction rate in peak area ratio derived from the carbon-carbon double bond of the conjugated diene polymer block before and after the hydrogenation. For measurement of the hydrogenation rate, for example, a nuclear magnetic resonator "ADVANCE 400 Nano Bay" (manufactured by Bruker Corporation) can be used, and for example, $CDCl_3$ can be used as a solvent.

(Bonding Mode of Polymer Block (A) and Polymer Block (B))

In the block copolymer (I), so long as the polymer block (A) and the polymer block (B) bond to each other, the bonding mode thereof is not particularly limited, and it may be any one of a linear bonding mode, a branched bonding mode, and a radial bonding mode, or a combination of two or more thereof. Above all, the bonding mode of the polymer block (A) and the polymer block (B) is preferably a linear bonding mode, and examples thereof include, when the polymer block (A) is represented by A and the polymer block (B) is represented by B, a diblock copolymer represented by A-B, a triblock copolymer represented by A-B-A or B-A-B, a tetrablock copolymer represented by A-B-A-B, a pentablock copolymer represented by A-B-A-B-A or B-A-B-A-B, and an (A-B)nX type copolymer (wherein X represents a coupling agent residue, and n represents an integer of 3 or more). Above all, a linear triblock copolymer or diblock copolymer is preferred, and an A-B-A type triblock copolymer is preferably used from the viewpoint of flexibility, easiness of production, and so on.

In this specification, in the case where polymer blocks of the same kind bond linearly via a bifunctional coupling agent or the like, all the bonding polymer blocks are dealt as one polymer block. According to this, including the above-mentioned exemplifications, the polymer block that intrinsically should be technically expressed as Y-X-Y (wherein X represents a coupling residue) is expressed as Y as a whole except for the case where it must be specifically differentiated from a single polymer block Y. In this description, the polymer block of this kind that contains a coupling agent residue is dealt as above, and therefore, for example, a block copolymer that contains a coupling agent residue and should be technically expressed as A-B-X-B-A (wherein X represents a coupling agent residue) is expressed as A-B-A and is dealt as an example of a triblock copolymer.

(Peak Top Temperature of tan δ of Block Copolymer (I))

In the block copolymer (I), with respect to a test piece prepared in conformity with JIS K7244-10 (2005), specifically, according to the method described in the section of Examples, a peak top temperature of tan δ of this test piece as measured under a condition of a thickness of 1 mm, a strain amount of 0.1%, a frequency of 1 Hz, a measurement temperature of −70 to 70° C., and a temperature rise rate of 3° C./min is −50 to 50° C., preferably −40 to 40° C., more preferably −30 to 30° C., and still more preferably −25 to 25° C.

When the aforementioned peak top temperature of tan δ is lower than −50° C., sufficient damping properties and sound insulation properties are not obtained in an actual use environment, whereas when it is higher than 50° C., requirements for desired adhesiveness and hardness cannot be satisfied, and hence, such is not preferred.

The peak top temperature of tan δ of the block copolymer (I) significantly contributes to the damping properties and the sound insulation properties. The tan δ (loss tangent) is a ratio of (loss modulus)/(storage modulus) at a frequency of 1 Hz in the dynamic viscoelasticity measurement, and when the peak top temperature of tan δ exists in a range of −50 to 50° C., the damping properties and the sound insulation properties of the foam molded body of the resin composition containing the block copolymer (I) can be improved.

(Peak Top Molecular Weight of Block Copolymer (I))

A peak top molecular weight of the block copolymer (I) as determined in terms of standard polystyrene by gel permeation chromatography is 30,000 to 500,000, preferably 50,000 to 450,000, more preferably 70,000 to 400,000, still more preferably 80,000 to 350,000, and especially preferably 90,000 to 300,000. When the peak top molecular weight of the block copolymer (I) is less than 30,000, the damping properties and the sound insulation properties of the foam molded body using the resin composition containing the block copolymer (I) are lowered, and the mechanical properties, such as breaking strength, cannot be kept, whereas when it is more than 500,000, the gas venting properties of the foam molded body using the resin composition containing the block copolymer (I) are lowered, and it becomes difficult to realize desired weight reduction.

(Weight Average Molecular Weight (Mw) of Block Copolymer (I))

A weight average molecular weight of the block copolymer (I) is preferably 80,000 to 700,000, more preferably 90,000 to 600,000, still more preferably 100,000 to 500,000, especially preferably 110,000 to 400,000, and most preferably 120,000 to 350,000.

In the block copolymer (I) of the present invention, when the weight average molecular weight falls within the aforementioned range, the dynamic characteristics, such as breaking strength, can be kept, and not only favorable gas venting properties and weight reduction can be realized, but also the damping properties and the sound insulation properties can be improved.

Though a molecular weight distribution {(weight average molecular weight (Mw))/(number average molecular weight (Mn))} of the block copolymer (I) is not particularly limited, it is preferably 1.0 to 1.8, more preferably 1.0 to 1.6, and still more preferably 1.0 to 1.4. When the molecular weight distribution of the block copolymer (I) falls within this range, not only the mechanical properties can be kept, but also low-molecular components hardly bleed out of the resulting foam molded body.

(Glass Transition Temperature Derived from Polymer Block (B) of Block Copolymer (I))

From the viewpoint of damping properties, a glass transition temperature (Tg) derived from the polymer block (B) of the block copolymer (I) is preferably −50 to 50° C., more preferably −45 to 20° C., still more preferably −40 to 15° C., and especially preferably −35 to 10° C. In this specification, the glass transition temperature means a glass transition temperature measured with a differential scanning calorimeter at a temperature rise rate of 10° C./min. More specifically, the glass transition temperature is described in the section of Examples.

So long as the object and effects of the present invention are not impaired, the block copolymer (I) may have one or more functional groups, such as a carboxy group, a hydroxy group, an acid anhydride group, an amino group, and an epoxy group, in a molecular chain and/or a molecular end, and it may also be one not having a functional group.

(Production Method of Block Copolymer (I))

The block copolymer (I) can be produced according to a solution polymerization method, an emulsion polymerization method, a solid-phase polymerization method, or the like. Above all, a solution polymerization method is preferred, and for example, a known method, such as an ionic polymerization method, e.g., anionic polymerization and cationic polymerization, and a radical polymerization method, is applicable. Above all, an anionic polymerization method is preferred. In the anionic polymerization method, an aromatic vinyl compound and an aliphatic hydrocarbon compound having a carbon-carbon double bond are successively added in the presence of a solvent, an anionic polymerization initiator, and optionally, a Lewis base, to perform polymerization, and thereafter, if desired, a coupling agent is added to allow the mixture to react with other, and an active hydrogen compound, such as an alcohol, a carboxylic acid, and water, is added to stop the polymerization reaction, whereby the unhydrogenated block copolymer (I-N) can be obtained.

Thereafter, if desired, by subjecting the resulting block copolymer to a hydrogenation reaction in an inert organic solvent in the presence of a hydrogenation catalyst, the hydrogenated block copolymer (I-H) can be obtained. The hydrogenation reaction can be carried out under a hydrogen pressure of 0.1 to 20 MPa, preferably 0.5 to 15 MPa, and more preferably 0.5 to 5 MPa at a reaction temperature of 20 to 250° C., preferably 50 to 180° C., and more preferably 70 to 180° C. for a reaction time of typically 0.1 to 100 hours, and preferably 1 to 50 hours.

Examples of the hydrogenation catalyst include Raney nickel; a heterogeneous catalyst having a metal, such as Pt, Pd, Ru, Rh, and Ni, supported on an elemental substance, such as carbon, alumina, and diatomaceous earth; a Ziegler-based catalyst composed of a combination of a transition metal compound with an alkylaluminum compound, an alkyllithium compound, or the like; and a metallocene-based catalyst.

In the aforementioned method, examples of an organic lithium compound which may be used as the polymerization initiator include methyllithium, ethyllithium, n-butyllithium, sec-butyllithium, tert-butyllithium, and pentyllithium. In addition, examples of a dilithium compound which may be used as the polymerization initiator include naphthalenedilithium and dilithiohexylbenzene.

Examples of the aforementioned coupling agent include phenyl benzoate, ethyl benzoate, ethyl acetate, methyl acetate, methyl pivalate, phenyl pivalate, ethyl pivalate, α,α'-dichloro-o-xylene, α,α'-xylene, α,α'-dichloro-p-xylene, bis(chloromethyl) ether, dibromomethane, diiodomethane, dimethyl phthalate, dichlorodimethylsilane, trichloromethylsilane, tetrachlorosilane, and divinylbenzene. The amount of each of the polymerization initiator and the coupling agent to be used is suitably determined depending on the desired peak top molecular weight of the intended block copolymer (I). In general, the initiator, such as an alkyllithium compound and a dilithium compound, is used preferably in a proportion of 0.01 to 1 part by mass based on 100 parts by mass of the total amount of the monomers to be used for the polymerization, inclusive of an aromatic vinyl compound, butadiene, and isoprene. In the case where the coupling agent is used, the amount thereof to be used is preferably 0.001 to 1 part by mass based on 100 parts by mass of the total amount of the aforementioned monomers.

The solvent is not particularly limited so long as it does not adversely affect the anionic polymerization reaction. Examples thereof include aliphatic hydrocarbons, such as cyclohexane, methylcyclohexane, n-hexane, and n-pentane; and aromatic hydrocarbons, such as benzene, toluene, and xylene. In addition, the polymerization reaction is typically performed at a temperature of −50 to 100° C., and preferably −20 to 80° C. for 0.5 to 50 hours, and preferably 1 to 30 hours.

In the case where the polymer block (B) of the block copolymer (I) contains a structural unit derived from an aliphatic hydrocarbon having a carbon-carbon double bond, and the structural unit derived from an aliphatic hydrocarbon having a carbon-carbon double bond is a structural unit derived from a conjugated diene, the content of each of the 3,4-bond and the 1,2-bond of the polymer block (B) can be increased by a method of adding a Lewis base as a co-catalyst on the occasion of polymerization.

Examples of the Lewis base which can be used include ethers, such as dimethyl ether, diethyl ether, and tetrahydrofuran; glycol ethers, such as ethylene glycol dimethyl ether and diethylene glycol dimethyl ether; and amines, such as triethylamine, N,N,N',N'-tetramethylenediamine, and N-methylmorpholine. These Lewis bases can be used either alone or in combination of two or more thereof.

In the case where the polymer block (B) of the block copolymer (I) contains a structural unit derived from a conjugated diene compound, the addition amount of the Lewis base is determined depending upon the intended vinyl bond content of the isoprene unit and/or the butadiene unit constituting the polymer block (B). For that reason, though the addition amount of the Lewis base is not strictly limited, it is preferred to use the Lewis base in an amount in the range of typically from 0.1 to 1,000 mol, and preferably from 1 to 100 mol per gram atom of lithium contained in the alkyllithium compound or the dilithium compound to be used as the polymerization initiator.

The block copolymer (I) thus obtained can be acquired by solidification by pouring the polymerization reaction liquid into methanol or the like, followed by heating or drying under reduced pressure; or performing so-called steam stripping by pouring the polymerization reaction liquid into hot water along with steam and subjecting the solvent to azeotropic removal, followed by heating or drying under reduced pressure.

(Olefin-Based Polymer (II))

The olefin-based polymer (II) is at least one olefin-based polymer (II) selected from the group consisting of an ethylene-propylene-diene copolymer (hereinafter sometimes abbreviated as "EPDM") rubber, an ethylene-vinyl acetate copolymer (hereinafter sometimes abbreviated as "EVA"), and a polyethylene-based resin. Examples of the diene which can be used as the ethylene-propylene-diene copolymer rubber include chain non-conjugated dienes, such as 1,4-hexadiene, 1,6-octadiene, 2-methyl-1,5-hexadiene, 6-methyl-1,6-heptadiene, and 7-methyl-1,6-octadiene; cyclic non-conjugated dienes, such as cyclohexadiene, dichloropentadiene, methyltetrahydroindene, 5-vinylnorbornene, 5-ethylidene-2-norbornene, 5-methyl-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene.

Though the ethylene-vinyl acetate copolymer (EVA) is not particularly limited, the content of vinyl acetate is preferably 5 to 45% by mass, more preferably 10 to 40% by mass, and still more preferably 15 to 35% by mass relative to the total mass of EVA. When the content of vinyl acetate of EVA is low, the resulting resin composition tends to become hard, whereas when the content of vinyl acetate of EVA is high, EVA is not sufficiently crosslinked, and the mechanical strength of the foam molded body tends to become insufficient. When the content of vinyl acetate of EVA is 5 to 45% by mass, a foam molded body obtained from the resin composition containing the block copolymer (I) and the olefin-based polymer (II) has appropriate flexibility, is favorable in damping properties, sound insulation properties, gas venting properties, and adhesiveness to other member, such as a panel, and is able to realize weight reduction and also able to hold mechanical properties, such as breaking strength.

A melt flow rate (MFR) of EVA as measured in conformity with JIS K7210 (2014) is preferably 0.3 g/10 min or more, more preferably 0.5 to 80.0 g/10 min, still more preferably 1.0 to 50.0 g/10 min, and especially preferably 1.2 to 30.0 g/10 min. The MFR is one measured under a condition at 190° C. and a load of 21.18 N. When the melt flow rate of EVA falls within the aforementioned range, the moldability becomes favorable.

In this specification, the polyethylene-based resin means a polyethylene-based resin exclusive of one containing an ethylene-vinyl acetate copolymer.

Examples of the polyethylene-based resin include homopolymers of ethylene, such as high-density polyethylene, medium-density polyethylene, and low-density polyethylene; and ethylene-based copolymers, such as an ethylene/butene-1 copolymer, an ethylene/hexene copolymer, an ethylene/heptene copolymer, an ethylene/octene copolymer, an ethylene/4-methylpentene-1 copolymer, an ethylene/vinyl acetate copolymer, an ethylene/acrylic acid copolymer, an ethylene/acrylic acid ester copolymer, an ethylene/methacrylic acid copolymer, and an ethylene/methacrylic acid ester copolymer.

The content of the structural unit derived from ethylene of the polyethylene-based resin is preferably 30 to 100 mol %, more preferably 50 to 100 mol %, and still more preferably 80 to 100 mol % on the basis of the total structural unit of the polyethylene-based resin from the viewpoint of appropriate flexibility, damping properties, and sound insulation properties of the foam molded body obtained from the resin composition containing the block copolymer (I) and the olefin-based polymer (II).

A content proportion of the olefin-based polymer (II) and the block copolymer (I) in the resin composition [(olefin-based polymer (II))/(block copolymer (I))] is preferably 1/99 to 99/1 in terms of a mass ratio. The foregoing mass ratio [(olefin-based polymer (II))/(block copolymer (I))] is more preferably 5/95 to 95/5, still more preferably 10/90 to 80/20, yet still more preferably 10/90 to 60/40, and especially preferably 10/90 to 45/55. When the foregoing mass ratio falls within this range, the foam molded body obtained from the resin composition containing the block copolymer (I) and the olefin-based polymer (II) is favorable in damping properties, sound insulation properties, gas venting properties, and adhesiveness to other member, such as a panel and is able to realize weight reduction and also to hold mechanical properties, such as breaking strength.

The total content of the block copolymer (I) and the olefin-based polymer (II) in the resin composition (100% by mass) is preferably 50% by mass or more, more preferably 80% by mass or more, still more preferably 90% by mass or more, and yet still more preferably 95% by mass or more.
(Crosslinking Agent (III))

Examples of the crosslinking agent (III) include a radical generator, sulfur, and a sulfur compound.

Examples of the radical generator include organic peroxides, such as a dialkyl monoperoxide, e.g., dicumyl peroxide, di-t-butyl peroxide, and t-butylcumyl peroxide; a diperoxide, e.g., 2,5-dimethyl-2,5-di(t-butylperoxy)hexane, 2,5-dimethyl-2,5-di(t-butylperoxy)hexyne-3, bis(t-butyldioxyisopropyl)benzene, 1,1-bis(t-butylperoxy)-3,3,5-trimethylcyclohexane, and n-butyl-4,4-bis(t-butylperoxy) valerate; a diacyl peroxide, e.g., benzoyl peroxide, p-chlorobenzoyl peroxide, and 2,4-dichlorobenzoyl peroxide; a monoacylalkyl peroxide, e.g., t-butylperoxy benzoate; a percarbonate, e.g., t-butylperoxyisopropyl carbonate; and a diacyl peroxide, e.g., diacetyl peroxide and lauroyl peroxide. These may be used alone or may be used in combination of two or more thereof. Above all, 2,5-dimethyl-2,5-di(t-butylperoxy)hexane and dicumyl peroxide are preferred from the viewpoint of reactivity.

In the case of using the radical generator, its content is preferably 0.01 to 15 parts by mass, more preferably 0.05 to 10 parts by mass, still more preferably 0.1 to 5 parts by mass, and especially preferably 0.1 to 3 parts by mass based on 100 parts by mass of the sum total of the block copolymer (I) and the olefin-based polymer (II).

Examples of the sulfur compound include sulfur monochloride and sulfur dichloride.

In the case of using sulfur or the sulfur compound, its content is preferably 0.1 to 20 parts by mass, more preferably 0.5 to 10 parts by mass, and still more preferably 1 to 10 parts by mass based on 100 parts by mass of the sum total of the block copolymer (I) and the olefin-based polymer (II).

As the crosslinking agent (III), in addition, a phenol-based resin, such as an alkylphenol resin and a brominated alkylphenol resin; or a combination of p-quinone dioxime and lead dioxide, a combination of p,p'-dibenzoylquinone dioxime and trilead tetroxide, or the like can also be used.

The resin composition may contain, in addition to the crosslinking agent (III), a crosslinking aid and a crosslinking promoter.

As the crosslinking aid, known crosslinking aids can be used. Examples thereof include polyfunctional monomers, such as trimethylolpropane trimethacrylate, trimethylolpropane triacrylate, triallyl trimellitate, triallyl 1,2,4-benzenetricarboxylate, triallyl isocyanurate, 1,6-hexanediol dimethacrylate, 1,9-nonanediol dimethacrylate, 1,10-decanediol dimethacrylate, polyethylene glycol dimethacrylate, ethylene glycol dimethacrylate, diethylene glycol dimethacrylate, triethylene glycol dimethacrylate, divinylbenzene, glycerol dimethacrylate, and 2-hydroxy-3-acryloyloxypropyl methacrylate; stannous chloride, ferric chloride, organic sulfonic acids, polychloroprene, and chlorosulfonated polyethylene. Above all, triallyl isocyanurate is preferred.

The crosslinking aid may be used alone or may be used in combination of two or more thereof.

In the case of containing the crosslinking aid, its content is preferably 0.1 to 40 parts by mass, more preferably 0.5 to 20 parts by mass, and still more preferably 2 to 20 parts by mass based on 100 parts by mass of the sum total of the block copolymer (I) and the olefin-based polymer (II).

Examples of the crosslinking promoter include thiazoles, such as N,N-diisopropyl-2-benzothiazole sulfenamide, 2-mercaptobenzothiazole, and 2-(4-morpholinodithio)benzothiazole; guanidines, such as diphenylguanidine and triphenylguanidine; aldehyde-amine-based reaction products or aldehyde-ammonia-based reaction products, such as a butylaldehyde-aniline reaction product and a hexamethylenetetramine-acetaldehyde reaction product; imidazolines, such as 2-mercaptoimidazoline; thioureas, such as thiocarbanilide, diethylurea, dibutylthiourea, trimethylthiourea, and di-ortho-tolylthiourea; dibenzothiazyl disulfide; thiuram monosulfides or thiuram polysulfides, such as tetramethylthiuram monosulfide, tetramethylthiuram disulfide, and pentamethylenethiuram tetrasulfide; thiocarbamates, such as zinc dimethyldithiocarbamate, zinc ethylphenyldithiocarbamate, sodium dimethyldithiocarbamate, selenium dimethyldithiocarbamate, and tellurium diethydithiocarbamate; xanthogenates, such as zinc dibutylxanthogenate; and zinc oxide. The crosslinking promoter may be used alone or may be used in combination of two or more thereof.
(Foaming Agent (IV))

Examples of the foaming agent (IV) include inorganic foaming agents, such as ammonium carbonate, ammonium hydrogencarbonate, sodium hydrogencarbonate, ammonium nitrite, sodium borohydride, and an azide; organic foaming agents, such as N-nitroso-based compounds, e.g., N,N'-dinitrosopentamethylenetetramine and N,N'-dimethyl-N,N'-dinitrosoterephthalamide; azo-based compounds, e.g., azobisisobutyronitrile, azodicarbonamide, and barium azodicarboxylate; fluoroalkanes, e.g., trichloromonofluoromethane and dichloromonofluoromethane; sulfonyl hydrazine-based compounds, e.g., paratoluenesulfonyl hydrazide, diphenylsulfone-3,3'-disulfonyl hydrazide, 4,4'-oxybis(benzensulfonyl hydrazide), and allylbis(sulfonyl hydrazide); sulfonyl semicarbazide-based compounds, e.g., p-toluylenesulfonyl semicarbazide and 4,4'-oxybis(benzenesulfonyl semicarbazide); and triazole-based compounds, e.g., 5-morpholyl-1,2,3,4-thiatriazole; and thermal expandable fine particles of a thermal expandable compound, e.g., isobutene and pentane, encapsulated in a microcapsule composed of a thermoplastic resin, e.g., vinylidene chloride, acrylonitrile, an acrylic acid ester, and a methacrylic acid ester. These may be used alone or may be used in combination of two or more thereof.

The content of the foaming agent is preferably 0.1 to 30 parts by mass, more preferably 0.2 to 25 parts by mass, still more preferably 0.5 to 20 parts by mass, and especially preferably 0.5 to 10 parts by mass based on 100 parts by mass of the sum total of the block copolymer (I) and the olefin-based polymer (II).
(Other Components)

The resin composition may also be one further containing other thermoplastic polymer. Examples of the other thermoplastic polymer include polyphenylene ether-based resins; polyamide-based resins, such as polyamide 6, polyamide 6-6, polyamide 6-10, polyamide 11, polyamide 12, polyamide 6.12, polyhexamethylenediamine terephthalamide, polyhexamethylenediamine isophthalamide, and a xylene group-containing polyamide; polyester-based resins, such as polyethylene terephthalate and polybutylene terephthalate; acrylic resins, such as polymethyl acrylate and polymethyl methacrylate; polyoxymethylene-based resins, such as a polyoxymethylene homopolymer and a polyoxymethylene copolymer; styrene-based resins, such as a styrene homopolymer, an acrylonitrile-styrene resin, and an acrylonitrile-butadiene-styrene resin; a polycarbonate resin; a styrene-based elastomer, such as a styrene/butadiene copolymer rubber and a styrene/isoprene copolymer rubber, or a hydrogenation product thereof or a modified product thereof, a natural rubber; a chloroprene rubber; an acryl rubber; an acrylonitrile-butadiene rubber; an epichlorohydrin rubber; a silicone rubber; chlorosulfonated polyethylene; a urethane rubber; a polyurethane-based elastomer; a polyamide-based elastomer; a polyester-based elastomer; and a soft polyvinyl chloride resin.

(Other Additives)

The resin composition may also be one further containing various additives within a range where the effects of the present invention are not impaired. Examples of such additives include a processing aid, a reinforcing agent, a filler, a plasticizer, an open-cell foaming agent, a heat stabilizer, a light stabilizer, a UV absorber, an antioxidant, a lubricant, an antistatic agent, an antimicrobial agent, an antifungal agent, a dispersant, a coloring agent, and a foaming aid.

The resin composition may contain a processing aid, if desired. The processing aid exhibits an action, such as improvement of processability and promotion of dispersion of a filler. Examples of the processing aid include stearic acid and a salt thereof, and a fatty acid amide.

In the case of containing the processing aid, the content of the processing aid in the resin composition is typically 0.1 to 5 parts by mass, and preferably 0.5 to 4 parts by mass based on 100 parts by mass of the sum total of the block copolymer (I) and the olefin-based polymer (II).

Examples of the reinforcing agent and/or the filler include metal oxides, composite oxides, metal carbonates, metal sulfates, and metal hydroxides, such as talc, silica, alumina, mica, titania, zinc oxide, zeolite, calcium carbonate (for example, heavy calcium carbonate), magnesium carbonate, barium sulfate, and aluminum hydroxide, and carbon black.

In the case of containing the reinforcing agent and/or the filler, the content of the reinforcing agent and/or the filler in the resin composition is typically 10 to 200 parts by mass, preferably 20 to 180 parts by mass, and more preferably 30 to 160 parts by mass based on 100 parts by mass of the sum total of the block copolymer (I) and the olefin-based polymer (II). When the content of the reinforcing agent and/or the filler falls within the aforementioned range, the molding processability becomes favorable, and the mechanical properties of the foam molded body obtained from the resin composition, such as breaking strength, can be held.

Examples of the plasticizer include petroleum-based process oils, such as paraffin-based process oil and naphthene-based process oil; aromatic process oils; phthalic acid derivatives, such as dioctyl phthalate and dibutyl phthalate; ester-based plasticizers, such as di-2-ethylhexyl phthalate, dihexyl phthalate, dinonyl phthalate, di-2-ethylhexyl adipate, dioctyl adipate, and dinonyl adipate; white oil; mineral oil; vegetable-based plasticizers, such as peanut oil and rosin; liquid paraffin; and synthetic plasticizers, such as a liquid cooligomer of ethylene and an α-olefin, liquid polybutene, liquid polybutadiene, liquid polyisoprene, a liquid polyisoprene/butadiene copolymer, a liquid styrene/butadiene copolymer, and a liquid styrene/isoprene copolymer.

In the case of containing the plasticizer, its content is preferably 0.5 to 200 parts by mass, more preferably 0.5 to 100 parts by mass, still more preferably 1 to 50 parts by mass, especially preferably 1.5 to 25 parts by mass, and most preferably 1.5 to 10 parts by mass based on 100 parts by mass of the total amount of the resin composition.

Examples of the heat stabilizer, the light stabilizer, the UV absorber, the antioxidant, and the like (hereinafter, these will be sometimes named generically as "antioxidant or the like") include an amine-based antioxidant, a phenol-based antioxidant, and a sulfur-based antioxidant. Specifically, examples thereof include amine-based antioxidants, such as phenylbutylamine and N,N'-di-2-naphthyl-p-phenylenediamine; phenol-based antioxidants, such as dibutylhydroxytoluene and tetrakis[methylene(3,5-di-t-butyl-4-hydroxy)hydrociannamate]methane; thioether-based antioxidants, such as bis[2-methyl-4-(3-n-alkylthiopropionyloxy)-5-t-butylphenyl] sulfide; dithiocarbamic acid salt-based antioxidants, such as nickel dibutyldithiocarbamate; benzoimidazole-based antioxidants, such as 2-mercaptobenzoyl imidazole and a zinc salt of 2-mercaptobenzoimidazole; and sulfur-based antioxidants, such as dilauryl thiodipropionate and distearyl thiodipropionate. These antioxidants may be used alone or may be used in combination of two or more thereof.

In the case of containing the antioxidant or the like, its content is typically 0.01 to 10 parts by mass, preferably 0.3 to 7.0 parts by mass, and more preferably 0.5 to 5.0 parts by mass based on 100 parts by mass of the sum total of the block copolymer (I) and the olefin-based polymer (II). When the content of the antioxidant or the like falls within the aforementioned range, a deposit (bloom) is not generated on the surface of the resulting foam molded body, and vulcanization inhibition is not generated, and hence, such is preferred.

[Crosslinking Method]

In the resin composition, it is preferred that the block copolymers (I), the block copolymer (I) and the olefin-based polymer (II), or the olefin-based polymers (II) are crosslinked with each other. Examples of the crosslinking method include a method of suitably adding the crosslinking agent (III), the crosslinking aid, and the crosslinking promoter to the block copolymer (I) and the olefin-based polymer (II) and kneading (crosslinking method 1); a resin crosslinking method (crosslinking method 2); a quinoid crosslinking method (crosslinking method 3); and a method of using an active energy ray or the like (crosslinking method 4).

<Re: Crosslinking Method 1>

In the resin composition of the present invention, by suitably adding the crosslinking agent (III), the crosslinking aid, and the crosslinking promoter to the block copolymer (I) and the olefin-based polymer (II) and kneading, the polymer block (B) of the block copolymer (I) and the olefin-based polymer (II) can be crosslinked with each other.

For example, a crosslinking aid, such as the aforementioned polyfunctional monomer, and a crosslinking promotor, such as dibenzothiazyl disulfide and tetramethylthiuram disulfide (so-called disulfide-based compound), may be used together with the crosslinking agent (III), such as the aforementioned radical generator, if desired.

In the case of performing the crosslinking by such a method, there is exemplified a method in which a resin composition containing the radical generator and optionally used other thermoplastic resin is melt kneaded under heating. The heating temperature is preferably 100 to 230° C. The melt kneading can be performed batchwise or continuously using an apparatus, such as an extruder, a kneader, a roll, and a plastograph. The crosslinking reaction may be allowed to proceed by such a melt kneading process. In addition, in the case of fabricating a crosslinked foam body, for example, the foaming reaction and the crosslinking reaction may be allowed to proceed simultaneously. In that case, as for the heating temperature at the time of the aforementioned melt kneading, the method can be performed at a temperature lower than a decomposition temperature of the foaming agent.

In the case of using sulfur or a sulfur compound as the crosslinking agent (III), it is extremely preferred to jointly use a crosslinking promotor, such as a thiazole, a guanidine, a butyl aldehyde-aniline reaction product, a hexamethylenetetr amine-acetaldehyde reaction product, an aldehyde-amine-based reaction product, a thiuram-based crosslinking promoter, and a dithiocarbamic acid salt-based crosslinking promoter.

In the case of performing the crosslinking by such a method, the crosslinkage can be formed by kneading the crosslinking agent (III), the crosslinking promoter, and so on with a roll or a mixer, such as a Banbury mixer, preferably at 50 to 250° C. (more preferably 80 to 200° C.) and then keeping the kneaded mixture preferably at 60° C. or higher (more preferably 90 to 250° C.) typically for 1 minute to 2 hours (more preferably 5 minutes to 1 hour).

<Re: Crosslinking Method 2>

In the crosslinking method by the resin crosslinking method, a phenol-based resin, such as an alkylphenol resin and a brominated alkylphenol resin, is used as the crosslinking agent (III), and stannous chloride, ferric chloride, an organic sulfonic acid, polychloroprene, chlorosulfonated polyethylene, or the like is used as the crosslinking aid.

In the case of performing the crosslinking by such a method, the crosslinking temperature is preferably 100 to 250° C., and more preferably 130 to 220° C. In the case of performing the resin crosslinking, it is extremely preferred to jointly use a crosslinking promoter.

<Re: Crosslinking Method 3>

In the crosslinking method by the quinoid crosslinking method, a combination of p-quinone dioxime and lead dioxide, a combination of p,p'-dibenzoylquinone dioxime and trilead tetroxide, or the like is used as the crosslinking agent (III).

In the case of performing the crosslinking by such a method, the crosslinking temperature is preferably 90 to 250° C., and more preferably 110 to 220° C. In the case of performing the quinoid crosslinking, it is preferred to jointly use a crosslinking promoter.

<Re: Crosslinking Method 4>

Examples of the active energy ray which may be used by the crosslinking method with an active energy ray include a particle beam, an electromagnetic wave, and a combination thereof. Examples of the particle beam include an electron beam (EB) and an α-ray; and examples of the electromagnetic wave include an ultraviolet ray (UV), a visible light ray, an infrared ray, a γ-ray, and an X-ray. Among those, an electron beam (EB) or an ultraviolet ray (UV) is preferred.

The irradiation time and the irradiation dose are not particularly limited and can be arbitrarily selected depending upon a degree of crosslinking.

[Production of Resin Composition]

The production method of the resin composition which is used in the present invention is not particularly limited, and the resin composition can be produced by mixing the block copolymer (I), the olefin-based polymer (II), and the crosslinking agent (III), and other components to be blended as needed, by using a mixing machine, such as a Henschel mixer, a V blender, a ribbon blender, a tumbler blender, and a conical blender; or after thus mixed, melt kneading the resultant mixture with a single-screw extruder, a twin-screw extruder, a kneader, a roll kneading machine, or the like. Though the temperature at the time of melt kneading can be suitably set, in general, it is preferably 80 to 300° C., and more preferably 100 to 250° C.

[Foamed Molded Body]

The foam molded body of the present invention is obtained by subjecting the aforementioned resin composition to foam molding. In the present invention, as the foaming method, a chemical method of performing foaming through decomposition or reaction of a foaming agent; a physical method, such as supercritical foaming and water foaming; and like can be adopted, and those methods may be used in combination. In addition, the method of producing a foam molded body is not particularly limited, a method which is typically adopted for foam molding, such as injection foam molding, extrusion foam molding, and press foam molding, can be adopted.

The foam molded body of the present invention is, for example, obtained by subjecting a resin composition resulting from dry-blending the foaming agent (IV) in the aforementioned resin composition to injection foam molding in a die provided with a cavity having a desired shape. Alternatively, the foam molded body having a desired shape can be obtained by subjecting the foregoing mixture to extrusion foam molding in an arbitrary shape, such as a cylindrical shape, and cutting the molded body in a predetermined size. In addition, on the occasion of producing a resin composition, the foam molding can also be performed by using a resin composition having the respective components and the foaming agent melt kneaded therein. In this case, the kneading temperature is preferably not higher than the decomposition temperature of the foaming agent.

<Production Method of Foamed Molded Body>

The production method of a foam molded body is not particularly limited. Examples of the production method of a foam molded body include a melt foam molding method and a solid-phase foam molding method.

The melt foam molding method is a method of forming air bubbles in the heat-melted resin composition, and examples thereof include a method in which after kneading the resin composition, the molding is performed while foaming the foaming agent in the resin composition (two-step method); and a method in which the continuous molding is performed while blowing a gas into an extruder (one-step method). Specifically, examples thereof include an injection foaming method and an extrusion foaming method.

The solid-phase foaming method is a method in which after melting the resin composition, the melt is solidified, and then, air bubbles are formed in the solidified resin composition. Specifically, examples thereof include bead foaming and press foaming.

The foam molded body may be foamed after crosslinking the resin composition; may be crosslinked upon irradiation with an electron beam or the like after foaming; or may be crosslinking while foaming.

An air bubble structure of the foam molded body may be of a closed-cell type in which the air bubbles do not come into contact with each other, or may also be of an open-cell type in which the air bubbles partially come into contact with each other. In this specification, as for the wording "open cell", the air bubbles in which air bubbles are mutually continued with each other or connected with the outside are referred to as "open cell".

The foam molded body of an open-cell type is hard to be permeated with water and is excellent from the standpoint of mechanical properties, such as waterproof, dust-proof, and breaking strength.

In the foam molded body of an open-cell type, on the occasion of adhering the foam molded body to other member with an adhesive or the like, permeability of the adhesive is favorable, and in particular, in the case where the adhesive is a moisture-curable adhesive, the foam molded body of an open-cell type absorbs the moisture through the open cells and is able to firmly achieve the adhesion, and hence, such is preferred. In addition, in the foam molded body of an open-cell type, in the case of using it for a dam rubber, etc. of preventing the adhesive from spreading into other site than the adhesive region, the adhesive is absorbed in the open cells of the foam molded body, so that useless spreading of the adhesive can be surely prevented from occurring; and in the case of using a moisture-curable adhesive, etc., not only the moisture in air can be fed through the open cells, but also a gas, such as carbon dioxide, can be released into the outside through the open cells, and hence, such is preferred.

An apparent density of the foam molded body is preferably 20 to 500 kg/m$^3$. When the apparent density of the foam molded body falls within this range, in spite of being lightweight, excellent damping properties and sound insulation properties can be revealed, and the mechanical properties, such as breaking strength, can be kept, too. Formability and workability can also be kept.

The apparent density of the foam molded body is more preferably 30 to 400 kg/m$^3$, still more preferably 70 to 300 kg/m$^3$, yet still more preferably 110 to 280 kg/m$^3$, and especially preferably 120 to 270 kg/m$^3$. It is also possible to suitably set the apparent density according to the intended frequency region or the like.

A foaming magnification of the foam molded body is not particularly limited, and the foaming magnification of the foam molded body is preferably 1.3 to 30 times. When the foaming magnification of the foam molded body is 1.3 to 3.0 times, the foam molded body can be suitably used as an exterior member of transportation equipment for automobile, vessel, railway vehicle, aircraft, or the like, such as a chenille, a weather strip sponge, and a glass run channel; and in the case where the foaming magnification of the foam molded body is more than 3.0 times and 30 times or less, the foam molded body can be suitably used as a dam rubber for transportation equipment as well as a dam rubber and a heat-insulating sponge for building.

[Dam Rubber]

The foam molded body of the present invention is favorable in damping properties, sound insulation properties, gas venting properties, and adhesiveness to other member, such as a panel, and not only the weight reduction can be realized, but also the mechanical properties, such as breaking strength, can be kept, and therefore, the foam molded body of the present invention can be applied to a dam rubber. Here, the dam rubber refers to a member which on the occasion of adhering an opening part for transportation equipment, such as an automobile, a vessel, a railway vehicle, and an aircraft, or for a building, to a panel for protecting the opening part, such as a glass, with an adhesive, prevents the adhesive from occurrence of useless spreading into other site than the adhesive region.

Figure 2:
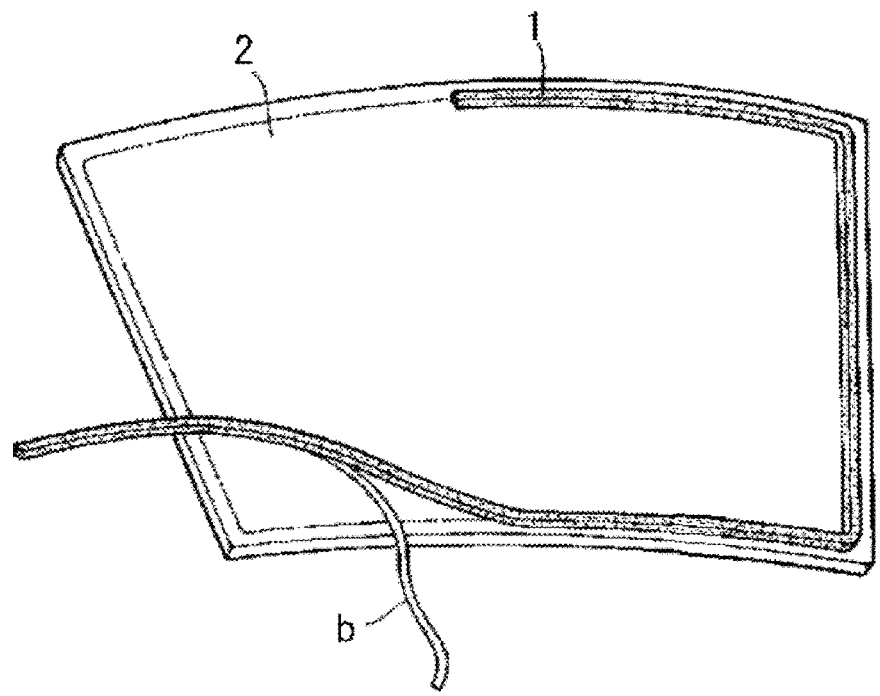
FIG. 2 is a view showing a state in which a dam rubber is arranged on the periphery of an inside surface of a panel.

FIG. 1 is a view showing an outline of a mounting structure of mounting a panel 2, such as a windshield, in a window frame 3 of a body 4, and FIG. 2 is a view showing a state in which a dam rubber 1 is arranged on the periphery of an inside surface of the panel 2. As shown in FIG. 1, the dam rubber 1 prevents a sealant 6 that is an adhesive for adhering the panel 2 and the window frame 3 to each other from spreading unnecessarily. In FIG. 1, a chenille 5 is arranged between the panel 2 and the window frame 3 and hermetically seals a gap between the window frame 3 and the panel 2. The shape of the dam rubber is not limited to the shape shown in FIG. 1. For example, as shown in FIG. 2, the dam rubber 1 may be formed in an elongated string-like shape having a rectangular cross section and may also be in a state where an adhesive surface (illustration is omitted) is formed on one surface of the dam rubber 1, and a release paper b is stuck onto this adhesive surface. The dam rubber 1 in this state may be, for example, one to be used in such a manner that after taking off the release paper b, it is stuck onto the periphery of the panel 2, such as a windshield, as shown in FIG. 2.

[Complex of Dam Rubber and Panel]

The present invention may also be concerned with a complex of the aforementioned dam rubber and a panel.

Figure 3:
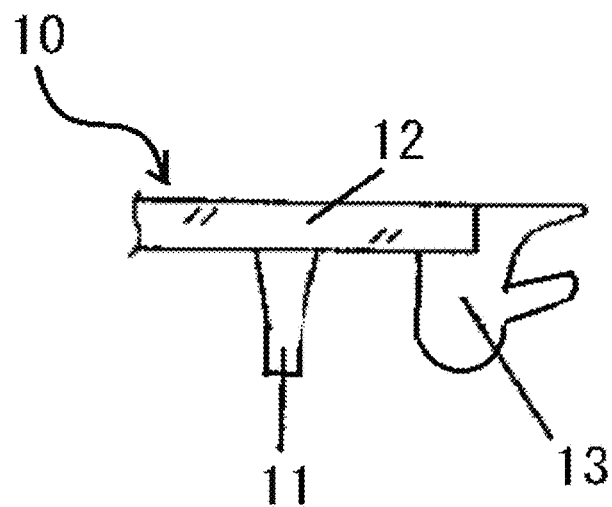
FIG. 3 is a view of an outline of a structure of a complex of a dam rubber and a panel.

For example, in a panel, such as a windshield to be installed in an opening of a body of transportation equipment, such as an automobile, a vessel, a railway vehicle, and an aircraft, or a building, there is a case where a resin frame body having been formed in a predetermined shape by a die is installed on at least one surface of a glass sheet. In this case, as another body from the resin frame body, a dam rubber part may be extrusion-molded together with this resin frame body and molded as a complex of the dam rubber and the panel. FIG. 3 shows a complex 10 of a dam rubber and a panel. A dam rubber 11 and a resin frame body 13 are integrally formed along the periphery of at least one surface (inside surface) of a panel 12 by means of extrusion molding.

In the case where the dam rubber and the panel are integrated in this way to constitute a complex, likewise the dam rubber formed as another body from the panel, a step of taking off a release paper or installing a dam rubber of sticking the dam rubber to the panel by using a tool, etc. such that the dam rubber can be stuck while keeping a fixed distance from the periphery of the panel along the periphery of the panel becomes unnecessary, whereby the production process can be rationalized, the costs can be reduced, and the productivity can be improved. The panel is preferably a panel made of a glass, a metal, or a plastic. Above all, by using a laminated glass as the panel, a complex with more excellent damping properties and sound insulation properties can be provided due to a synergistic effect between the laminated glass and the aforementioned dam rubber. The laminated glass is not particularly limited, and a laminated glass having a structure of three or more layers composed of glasses and an intermediate film for laminated glass can be preferably used.

[Other Products]

The foam molded body of the present invention can be used as, in addition to the dame rubber and the complex of a dam rubber and a panel, an exterior member for transportation equipment, such as a heat-insulating sponge, a chenille, a weather strip sponge, and a glass run channel; a holder of binding a door glass with an elevating device in an automobile; and besides, a building material, such as a door sealing material, a window frame material, and a floor material, a hose for transportation equipment, such an automobile, a sealing material for industrial machine, a seat, a rubber product for household use, and so on.

[Method for Increasing Sound Transmission Loss]

In one embodiment of the present invention, a method for increasing a sound transmission loss, including installing a foam molded body in a panel, wherein the foam molded body is molded from a resin composition containing a block copolymer (I) which is a block copolymer having a polymer block (A) composed mainly of a structural unit derived from an aromatic vinyl compound and other polymer block (B), exhibits a peak top temperature of tan δ, as measured under a condition of a thickness of a test piece of 1 mm, a strain amount of 0.1%, a frequency of 1 Hz, a measurement temperature, of −70 to 70° C., and a temperature rise rate of 3° C./min in conformity with JIS K7244-10 (2005) is −50 to 50° C., and has a peak top molecular weight, as determined in terms of standard polystyrene by gel permeation chromatography, of 30,000 to 500,000, at least one olefin-based polymer (II) selected from the group consisting of an ethylene-propylene-diene copolymer rubber, an ethylene-vinyl acetate copolymer, and a polyethylene-based resin, a crosslinking agent (III), and a foaming agent (Iv), is provided.

When the aforementioned foam molded body is installed in a panel, in a contact portion between the panel and other member, the propagation of solid borne sound is suppressed, and the sound insulation effect is increased, whereby the sound transmission loss can be increased.

Though an instillation location of the foam molded body is not particularly limited, for example, in the case where a panel made of a glass or the like is installed in a window frame of transportation equipment, such as an automobile, a vessel, a railway vehicle, and an aircraft, or a building, or the like, the foam molded body is preferably installed such that it intervenes between the panel and the window frame. For example, in the case where the foam molded body is installed between the window frame portion to be formed in the automobile body and the panel made of a glass or the like, there is a case where between the two members of the metal constituting the body for automobile and the glass constituting the panel, both of which are different in material quality from each other, a sound in a specified sound region is transmitted between the members, whereby the sound transmission loss is reduced. By installing the foam molded body in the panel in such a manner that the foam molded body intervenes between the window frame and the panel, not only the airtightness between the two members of the window frame and the panel is enhanced, but also the effect as a sound absorbing material is exhibited, and the sound transmission loss is increased, whereby the sound insulation effect can be enhanced. In addition, by installing the foam molded body of the present invention in the panel to fabricate a complex, the sound transmission loss in a frequency region at which the coincidence effect of the panel is generated can be increased. This is caused due to the matter that the foam molded body of the present invention suppresses bending vibration in a frequency region at which the coincidence effect of the panel is generated, whereby resonance with the vibration of an incident sound wave can be suppressed.

EXAMPLES

The present invention is hereunder described in more detail by reference to Examples, but it should be construed that the present invention is by no means limited by these Examples. The measurement of physical properties was performed by the following methods.

(1) Peak Top Molecular Weight (Mp), Weight Average Molecular Weight (Mw), Number Average Molecular Weight (Mn), and Molecular Weight Distribution (Mw/Mn)

A peak top molecular weight (Mp), a weight average molecular weight (Mw), a number average molecular weight (Mn), and a molecular weight distribution (Mw/Mn) of the block copolymer (I) as expressed in terms of polystyrene were determined by means of gel permeation chromatography (GPC) under the following condition.

In the case of containing two or more of the polymer block (A1) and the polymer block (A2) as the polymer block (A), the peak top weight molecular weight (Mp) of the polymer block (A2) was determined by subtracting the peak top molecular weight of the polymer block (A1-B) from the peak top molecular weight (Mp) of the polymer block (A1-B-A2). In addition, from the peak top molecular weight (Mp) of the polymer block (A1) and the peak top molecular weight (Mp) of the polymer block (A2), a ratio between the both {Mp(A1)/Mp(A2)} was determined.

(GPC Measurement Apparatus and Measurement Condition)

Apparatus: GPC apparatus "HLC-8020" (manufactured by Tosoh Corporation)

Separation columns: "TSKgel GMHXL", "G4000HXL", and "G5000HXL" (all of which are manufactured by Tosoh Corporation) were connected in series with each other.

Eluent: Tetrahydrofuran

Eluent flow rate: 1.0 mL/min

Sample concentration: 5 mg/10 mL

Column temperature: 40° C.

Detector: Differential refractive index (RI) detector

Calibration curve: Prepared using standard polystyrene (2) Content of Polymer Block (A)

The block copolymer (I) was dissolved in deuterated chloroform ($CDCl_3$) and subjected to a measurement of $^1$H-NMR spectrum [apparatus: ADVANCE 400 Nano Bay" (manufactured by Bruker Corporation), measurement temperature: 50° C.], and the content of the polymer block (A) was calculated from a peak area ratio derived from the styrene polymer block.

(3) Content of Polymer Block (B)

The block copolymer (I) was dissolved in $CDCl_3$ and subjected to a measurement of $^1$H-NMR spectrum [apparatus: ADVANCE 400 Nano Bay" (manufactured by Bruker Corporation), measurement temperature: 50° C.], and the content of the polymer block (B) was calculated from a peak area ratio derived from the conjugated diene polymer block.

(4) Vinyl Bond Content of Polymer Block (B)

The block copolymer (I) was dissolved in $CDCl_3$ and subjected to a measurement of $^1$H-NMR spectrum [apparatus: ADVANCE 400 Nano Bay" (manufactured by Bruker Corporation), measurement temperature: 50° C.], and a vinyl bond content (the total of the contents of the 3,4-bond unit and the 1,2-bond unit) was calculated from a ratio of the total peak area of the structural unit derived from isoprene and/or butadiene and the peak area corresponding to the 3,4-bond unit and the 1,2-bond unit in the isoprene structural unit, the 1,2-bond unit in the butadiene structural unit, or the aforementioned respective bond units in the case of the structural unit derived from a mixture of isoprene and butadiene.

(5) Peak Top Temperature and Peak Intensity of tan δ (Tangent Loss)

The block copolymer (I) was heat pressed under a condition at 230° C. for 5 minutes to obtain a sheet having a thickness of 1 mm. The obtained sheet was used and subjected to a measurement of a dynamic viscoelasticity under the following condition in conformity with JIS K7244-10 (2005), thereby determining a peak top temperature and a peak intensity of tan δ. The tan δ (loss tangent) is a ratio of (loss modulus)/(storage modulus).

(Dynamic Viscoelasticity Measurement Apparatus and Measurement Condition)

Apparatus: "ARES-G2" Rheometer (manufactured by TA Instruments)

Parallel plates: Diameter: 8 mm

Vibration mode: Torsional vibration

Strain amount: 0.1%

Frequency: 1 Hz

Measurement temperature: −70 to 70° C.

Temperature rise rate: 3° C./min (6) Glass Transition Temperature (° C.)

Using a differential scanning calorimeter, "DSC6200", manufactured by Seiko Instruments Inc., the block copolymer (I) was precisely weighed and subjected to temperature rise from −120° C. to 100° C. at a temperature rise rate of 10° C./min, and a temperature of an inflection point of the measurement curve was read out and defined as the glass transition temperature. In the case of the block copolymers (I) of Production Examples 1 to 5, the glass transition temperature derived from the polymer block B is observed.

1.25 kg of styrene was further added and polymerized for 1 hour. Methanol was poured into the resulting reaction liquid, to obtain a block copolymer (I-N-1) that is a polystyrene-polyisoprene-polystyrene triblock copolymer. The analysis results of the block copolymer (I-N-1) are shown in Table 2.

[Production Example 2] Production of Block Copolymer (I-N-2)

A dry nitrogen-purged pressure-resistant container was charged with 1.25 kg of styrene and 50.0 kg of cyclohexane as a solvent. To this solution, 72.6 g of sec-butyllithium (10% by mass cyclohexane solution) as an initiator was added, and the contents were polymerized at 60° C. for 1 hour. Subsequently, to this reaction mixture, 270 g of tetrahydrofuran as a Lewis base was added, 9.3 kg of isoprene was then added and polymerized for 2 hours, and 1.25 kg of styrene was further added and polymerized for 1 hour. Methanol was poured into the resulting reaction liquid, to obtain a block copolymer (I-N-2) that is a polystyrene-polyisoprene-polystyrene triblock copolymer. The analysis results of the block copolymer (I-N-2) are shown in Table 2.

TABLE 2

|  |  | Production Example 1 (I-N-1) | Production Example 2 (I-N-2) |
|---|---|---|---|
| Use amount (kg) | Cyclohexane | 50.0 | 50.0 |
|  | sec-Butyllithium (10% by mass cyclohexane solution) | 0.0762 | 0.0726 |
|  | Tetrahydrofuran | — | 0.270 |
|  | N,N,N',N'-Tetramethylethylenediamine | 0.060 | — |
|  | Styrene (A1) | 1.25 | 1.25 |
|  | Styrene (A2) | 1.25 | 1.25 |
|  | Isoprene | 9.0 | 9.3 |
| Physical properties | Polymer block sequence | A1-B-A2 | A1-B-A2 |
|  | Peak top molecular weight (Mp) | 133,000 | 128,000 |
|  | Mp(A1) | 10,000 | 10,500 |
|  | Mp(A2) | 10,000 | 10,500 |
|  | Mp(A1)/Mp(A2) | 1 | 1 |
|  | Weight average molecular weight (Mw) | 134,000 | 127,000 |
|  | Number average molecular weight (Mn) | 111,000 | 122,000 |
|  | Molecular weight distribution (Mw/Mn) | 1.21 | 1.04 |
|  | Content of polymer block (A) (% by mass) | 21.7 | 21.2 |
|  | Content of polymer block (B) (% by mass) | 78.3 | 78.8 |
|  | Hydrogenation rate (mol %) | 0 | 0 |
|  | Vinyl bond content of polymer block (B) (mol %) | 72.8 | 59.4 |
|  | Peak top temperature of tanδ (° C.) | 19.15 | −6.56 |
|  | Peak intensity of tanδ | 1.673 | 1.957 |
|  | Glass transition temperature (° C.) | 8 | −13 |
|  | Average methylene chain length in polymer block (B) | 1.5 | 1.8 |

[Each of Components Used in Examples]

Details or a production method of each of the components used in the Examples and Comparative Examples is hereunder described.

[Block Copolymer (I)]

(I): Block Copolymer (Production Examples 1 to 5, and see Tables 2 and 5)

[Production Example 1] Production of Block Copolymer (I-N-1)

A dry nitrogen-purged pressure-resistant container was charged with 1.25 kg of styrene and 50.0 kg of cyclohexane as a solvent. To this solution, 76.2 g of sec-butyllithium (10% by mass cyclohexane solution) as an initiator was added, and the contents were polymerized at 60° C. for 1 hour. Subsequently, to this reaction mixture, 60 g of tetramethylethylenediamine as a Lewis base was added, 9.0 kg of isoprene was then added and polymerized for 2 hours, and

[Olefin-Based Polymer (II)]

Olefin-based polymer (II-1): Ethylene-vinyl acetate (EVA) copolymer (product name: ULTRASEN 640, manufactured by Tosoh Corporation)

Olefin-based polymer (II-2): Ethylene-propylene-diene (EPDM) copolymer rubber (product name: ESPRENE 501A, manufactured by Sumitomo Chemical Co., Ltd.)

[Crosslinking Agent (III)]

Crosslinking agent (III): Peroxide-based crosslinking agent (product name: PERKADOX 14/40, manufactured by Kayaku Akzo Corporation) (a mixture composed of bis(t-butyl-dioxyisopropylkenzene (40% by mass), calcium carbonate (55.3% by mass), and amorphous silica diluted product (4.7% by mass))

[Foaming Agent (IV)]

Foaming agent (IV-1): Azo dicarbonamide-based composite foaming agent (product name: CELLMIC CAP-500, manufactured by Sankyo Kasei Co., Ltd.) (decomposition temperature: 155° C., gas amount: 160 mL/g)

Foaming agent (IV-2): Azo dicarbonamide-based composite foaming agent (product name: VP#35N, manufactured by Laboratory ITII Ltd.) (decomposition temperature: 159° C., gas amount: 119 mL/g)
Other Additives
Filler: Heavy calcium carbonate (manufactured by Shiraishi Calcium Kaisha, Ltd.)
Processing aid: Stearic acid (manufactured by Wako Pure Chemical Industries, Ltd.), PLATAK (manufactured by Laboratory ITII Ltd.) (components: stearic acid, hydrated amorphous silicon dioxide, petrolatum)
Plasticizer: Di-2-ethylhexyl phthalate (product name: SANSOCIZER DOP, manufactured by New Japan Chemical Co., Ltd.), paraffin-based process oil (product name: DIANA PROCESS OIL PW-380, manufactured by Idemitsu Kosan Co., Ltd.)
Open-cell foaming agent: CQ-50 (manufactured by Laboratory ITII Ltd.)

The foam molded bodies of the Examples and Comparative Examples were subjected to the following tests.

[Measurement of Apparent Density]

The apparent density was measured in conformity with JIS K7222 (2005), except for using a test piece described in each of the Examples and Comparative Examples.

[Measurement of Sound Transmission Loss]

Figure 4:
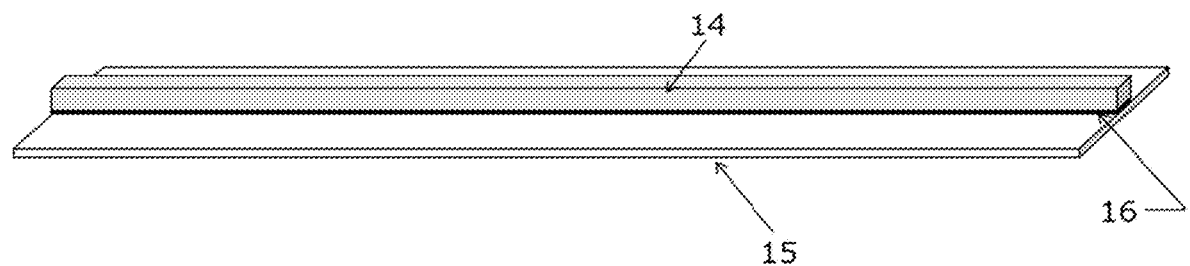
FIG. 4 is a view of an outline of a structure of a glass sheet having a foam molded body installed therein, as used for a mechanical impedance test.

As shown in FIG. 4, a test piece 14 which had been cut out from the foam molded body was installed in a central portion in the width direction of a glass sheet 15 (FL2 (four-side beveling processed), manufactured by Sanshiba Glass Co., Ltd.) of 25 mm in width×2.0 mm in thickness× 300 mm in length via a double-sided tape 16 (VR-5311, manufactured by Nitto Denko Corporation), and the following mechanical impedance test was performed using this.

A tip portion of an exciting force detector built in an impedance head of an exciter (power amplifier/model 371-A) of a mechanical impedance instrument (manufactured by Ono Sokki Co., Ltd., mass cancel amplifier: MA-5500, channel data station: DS-2100) was fixed to a central portion of the surface of the glass sheet opposite to the surface on which the foam molded body was installed. A vibration was given to the aforementioned central portion at a frequency in the range of from 0 to 10,000 Hz, and an exciting force and an acceleration waveform at this point were detected, thereby performing a damping test by the central exciting method. A mechanical impedance at an exciting point was determined on the basis of the obtained exciting force and a speed signal obtained by integrating an acceleration single, and an impedance curve was obtained by setting the frequency on the abscissa and the mechanical impedance on the ordinate, respectively.

With respect to a third peak (3rd mode) counted from the low frequency side of the obtained impedance curve, a frequency ($f_{res,3}$) and a loss factor ($\Theta_3$) were determined. In addition, a surface density of the glass sheet having the test piece installed therein was determined by measuring a mass of the whole of the glass sheet having the test piece installed therein and dividing it by an area of the glass sheet (25 mm×300 mm).

Next, a sound transmission loss (dB) at 20° C. at each of frequencies (100 Hz, 125 Hz, 160 Hz, 200 Hz, 250 Hz, 315 Hz, 400 Hz, 500 Hz, 630 Hz, 800 Hz, 1,000 Hz, 1,250 Hz, 1,600 Hz, 2,000 Hz, 2,500 Hz, 3,150 Hz, 4,000 Hz, 5,000 Hz, 6,300 Hz, 8,000 Hz, and 10,000 Hz) was calculated according to the calculation method described in ISO 16940: 2008.

Figure 5:
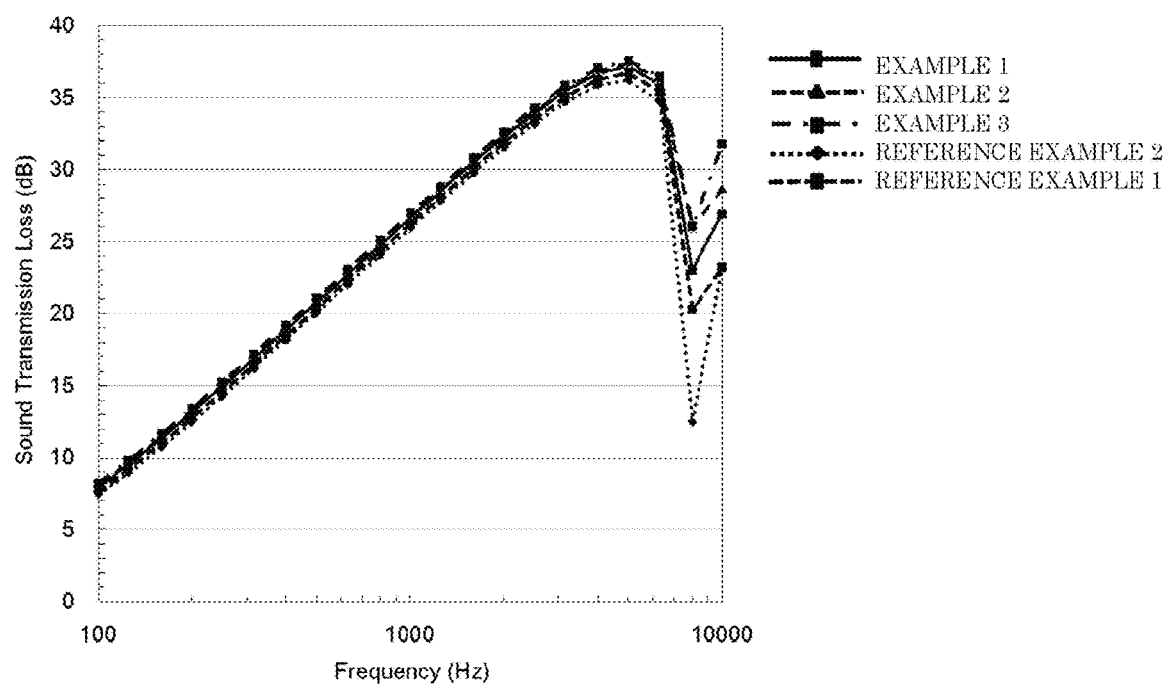
FIG. 5 is a graph showing a relation between a frequency (Hz) and a sound transmission loss (dB) in each of Examples 1 to 3 and Reference Examples 1 to 2.
Figure 6:
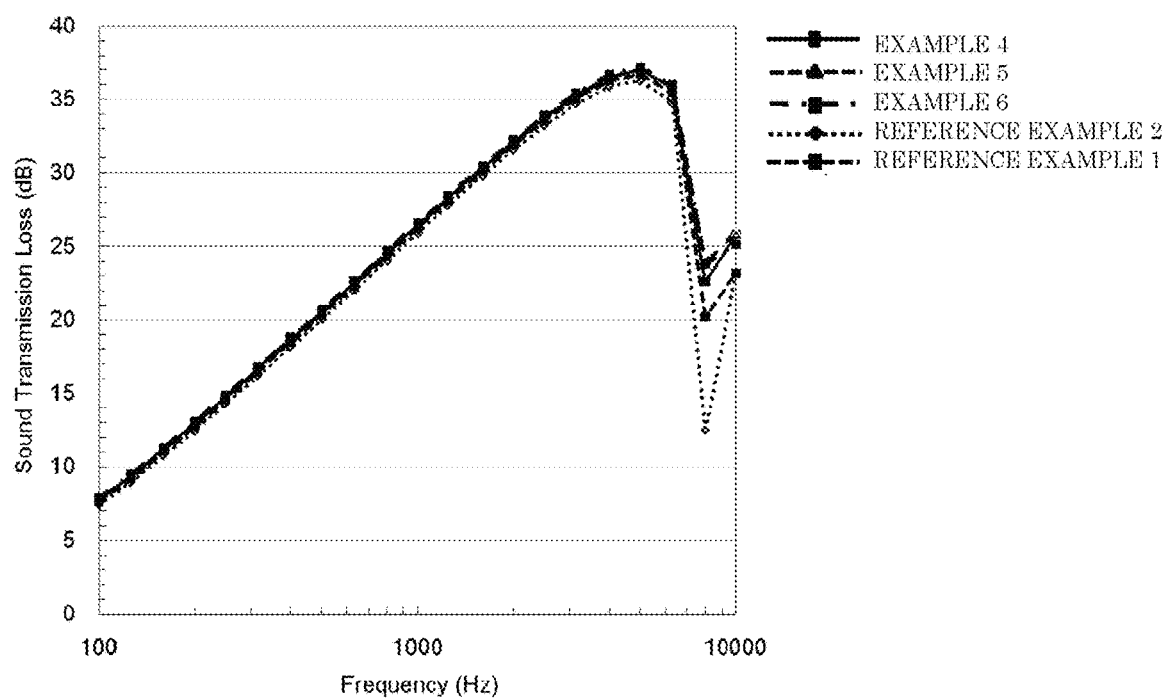
FIG. 6 is a graph showing a relation between a frequency (Hz) and a sound transmission loss (dB) in each of Examples 4 to 6 and Reference Examples 1 to 2.
Figure 7:
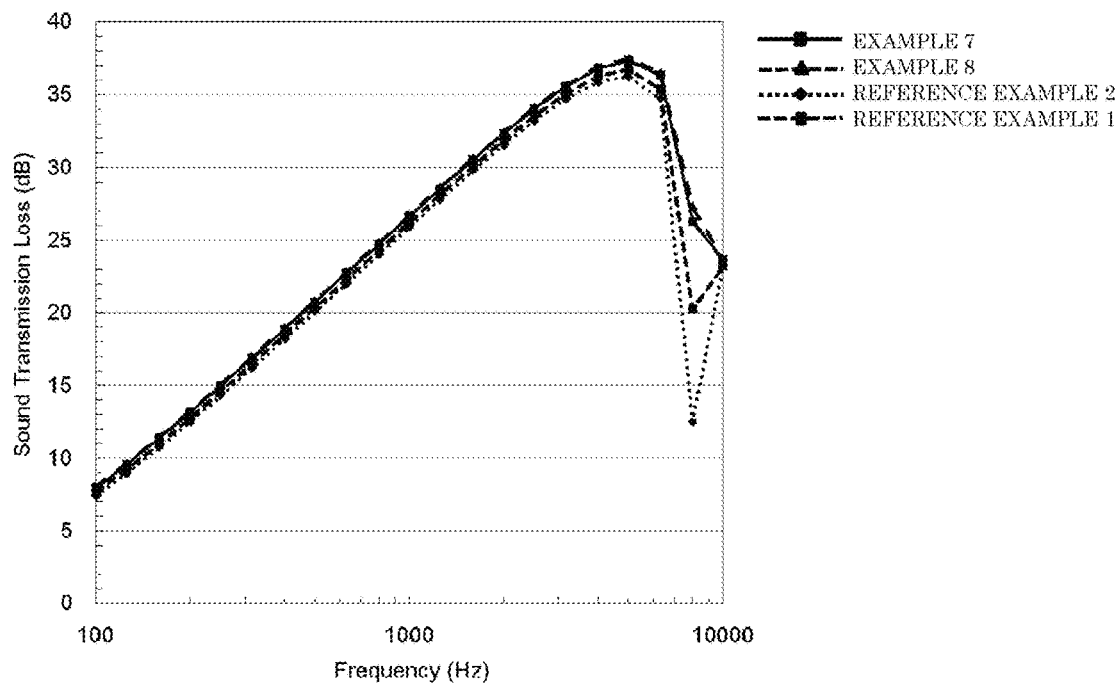
FIG. 7 is a graph showing a relation between a frequency (Hz) and a sound transmission loss (dB) in each of Examples 7 to 8 and Reference Examples 1 to 2.

FIG. 5 is a graph showing a relation between a frequency (Hz) and a sound transmission loss (dB) in each of Examples 1 to 3 and Reference Examples 1 to 2; FIG. 6 is a graph showing a relation between a frequency (Hz) and a sound transmission loss (dB) in each of Examples 4 to 6 and Reference Examples 1 to 2; and FIG. 7 is a graph showing a relation between a frequency (Hz) and a sound transmission loss (dB) in each of Examples 7 to 8 and Reference Examples 1 to 2.

[Increase of Sound Transmission Loss]

With respect to a sound transmission loss at each of frequencies (100 Hz, 125 Hz, 160 Hz, 200 Hz, 250 Hz, 315 Hz, 400 Hz, 500 Hz, 630 Hz, 800 Hz, 1,000 Hz, 1,250 Hz, 1,600 Hz, 2,000 Hz, 2,500 Hz, 3,150 Hz, 4,000 Hz, 5,000 Hz, 6,300 Hz, 8,000 Hz, and 10,000 Hz), an increase of the sound transmission loss was determined by subtracting a sound transmission loss (dB) of a glass sheet not having the foam molded body installed therein from a sound transmission loss (dB) of a glass sheet having the foam molded body installed therein.

[Increase of sound transmission loss (dB)]=[Sound transmission loss (dB) of a glass sheet having the foam molded body installed therein]− [Sound transmission loss (dB) of a glass sheet not having the foam molded body installed therein]

[Judgment of Sound Insulation Effect]

As for the judgment of sound insulation effect, a total value of increases of the sound transmission loss at the aforementioned respective frequencies was determined, and the judgment was achieved according to the following criteria.

Total value of increases of sound transmission loss: Judgment

Less than 15 dB: DD (no or scarce sound insulation effect is perceived)

15 dB or more and less than 20 dB: CC (sound insulation effect is perceived)

20 dB or more and less than 30 dB: BB (high sound insulation effect is perceived)

30 dB or more: AA (extremely high sound insulation effect is perceived)

Examples 1 to 3

The block copolymer (I-N-1), the olefin-based polymer (II-1), the filler, the processing aid, and the plasticizer were melt mixed in a proportion of the blending composition shown in Table 3 at a temperature of 120° C. by using a kneader, thereby obtaining a master batch.

Subsequently, to the obtained master batch, the crosslinking agent (III) and the foaming agent (IV-1) were added in a proportion of the blending composition shown in Table 3 and roll kneaded at a roll temperature of 110° C., thereby obtaining a composition. The obtained composition was subjected to a press treatment at 164° C. for 15 minutes by using a die having a thickness of 10 mm, thereby obtaining a foam molded body.

Using the obtained foam molded body, three test pieces having a different height from each other were cut out. Using a test piece having a width of 5.0 mm, a height of 5.0 mm, and a length of 300 mm for Example 1, a test piece having a width of 5.0 mm, a height of 6.5 mm, and a length of 300 mm for Example 2, and a test piece having a width of 5.0 mm, a height of 10.0 mm, and a length of 300 mm for Example 3, respectively, each of the measurements was performed. The results are shown in Table 3.

Examples 4 to 8

The block copolymer (I-N-1) or (I-N-2), the olefin-based polymer (II-2), the filler, the processing aid, and the plasticizer were melt mixed in a proportion of the blending composition shown in Table 4 at a temperature of 140° C. by using a kneader, thereby obtaining a master batch.

Subsequently, to the obtained master batch, the crosslinking agent (III) and the foaming agent (IV-2) as well as the open-cell foaming agent except in Example 5 were added in a proportion of the blending composition shown in Table 4 and roll kneaded at a roll temperature of 115° C., thereby obtaining a composition. The obtained composition was subjected to a press treatment at 170° C. for 12 minutes by using a die having a thickness of 10 mm, thereby obtaining a foam molded body.

Using the obtained foam molded body, a test piece having a width of 5.0 mm, a height of 5.0 mm, and a length of 300 mm was cut out for each of Examples 4 to 7, and a test piece having a width of 5.0 mm, a height of 6.5 mm, and a length of 300 mm was cut out for Example 8. The test pieces were each subjected to the respective measurements. The results are shown in Table 4.

Reference Example 1

A dam rubber for rear glass having a width of 5.0 mm, a height of 5.0 mm, and a length of 300 mm ("DAM RUBBER F BTM 65045AG011", manufactured by Fuji Heavy Industries Ltd.) was measured for the apparent density and the sound transmission loss. The results are shown in Table 3. The aforementioned dam rubber for rear glass is a foam molded body not containing the block copolymer (I) of the present invention.

Reference Example 2

A glass sheet not having the foam molded body installed therein was measured for the sound transmission loss. The results are shown in Table 3.

The blending of the foam molded bodies of the Examples, and the judgement and measurement results of the Examples and Reference Examples are shown in Tables 3 and 4.

TABLE 3

| | | | | Example 1 | Example 2 | Example 3 | Reference Example 1 | Reference Example 2 |
|---|---|---|---|---|---|---|---|---|
| Resin composition | Block co-polymer (I) | (I-N-1) | (mass parts) | 70 | 70 | 70 | Dam rubber for rear glass | Glass sheet alone |
| | | (I-N-2) | (mass parts) | | | | | |
| | Olefin-based polymer (II) | (II-1) ULTRASEN 640 | (mass parts) | 30 | 30 | 30 | | |
| | | (II-2) ESPRENE 501A | (mass parts) | | | | | |
| | Crosslinking agent (III) | PERKADOX 14/40 | (mass parts) | 0.6 | 0.6 | 0.6 | | |
| | Foaming agent (IV) | (IV-1) CELLMIC CAP-500 | (mass parts) | 4 | 4 | 4 | | |
| | | (IV-2) VP#35N | (mass parts) | | | | | |
| Other additives | Filler | Heavy calcium carbonate | (mass parts) | 100 | 100 | 100 | | |
| | Processing aid | Stearic acid PLATAK | (mass parts) | 2 | 2 | 2 | | |
| | Plasticizer | SANSOCIZER DOP | (mass parts) | 4 | 4 | 4 | | |
| | | DAIANA PROCESS OIL PW-380 | (mass parts) | | | | | |
| | Open-cell foaming agent | CQ-50 | (mass parts) | | | | | |
| Properties/physical properties | Apparent density | | (kg/m3) | 266 | 266 | 266 | 62 | — |
| | Impedance test | | | | | | | |
| | Width of test piece | | (mm) | 5.0 | 5.0 | 5.0 | 5.0 | — |
| | Height of test piece | | (mm) | 5.0 | 6.5 | 10.0 | 5.0 | — |
| | Length of test piece | | (mm) | 300 | 300 | 300 | 300 | — |
| | Frequency $f_{res.3}$ | | (Hz) | 1224.063 | 1208.438 | 1213.359 | 1233.125 | 1252.656 |
| | Loss factor $\eta_3$ | | (—) | 7.832E-03 | 1.512E-02 | 3.329E-02 | 1.487E-03 | 1.221E-03 |
| | Surface density of glass sheet having test piece installed therein | | (kg/m²) | 4.885 | 4.948 | 5.078 | 4.672 | 4.509 |
| | Sound transmission loss | | | | | | | |
| | 100 Hz | | (dB) | 7.960 | 8.047 | 8.224 | 7.661 | 7.427 |
| | 125 Hz | | (dB) | 9.523 | 9.616 | 9.805 | 9.201 | 8.948 |
| | 160 Hz | | (dB) | 11.368 | 11.467 | 11.668 | 11.026 | 10.757 |
| | 200 Hz | | (dB) | 13.119 | 13.222 | 13.430 | 12.763 | 12.481 |
| | 250 Hz | | (dB) | 14.927 | 15.033 | 15.246 | 14.560 | 14.270 |
| | 315 Hz | | (dB) | 16.842 | 16.950 | 17.167 | 16.468 | 16.171 |
| | 400 Hz | | (dB) | 18.851 | 18.960 | 19.181 | 18.472 | 18.170 |
| | 500 Hz | | (dB) | 20.743 | 20.854 | 21.076 | 20.361 | 20.057 |
| | 630 Hz | | (dB) | 22.710 | 22.822 | 23.045 | 22.325 | 22.019 |
| | 800 Hz | | (dB) | 24.742 | 24.855 | 25.078 | 24.355 | 24.046 |
| | 1000 Hz | | (dB) | 26.629 | 26.744 | 26.967 | 26.241 | 25.930 |
| | 1250 Hz | | (dB) | 28.496 | 28.612 | 28.836 | 28.107 | 27.793 |
| | 1600 Hz | | (dB) | 30.519 | 30.639 | 30.861 | 30.128 | 29.810 |
| | 2000 Hz | | (dB) | 32.283 | 32.407 | 32.628 | 31.888 | 31.564 |
| | 2500 Hz | | (dB) | 33.943 | 34.074 | 34.294 | 33.543 | 33.210 |
| | 3150 Hz | | (dB) | 35.475 | 35.620 | 35.836 | 35.068 | 34.716 |
| | 4000 Hz | | (dB) | 36.696 | 36.888 | 37.075 | 36.272 | 35.886 |

TABLE 3-continued

|  |  | Example 1 | Example 2 | Example 3 | Reference Example 1 | Reference Example 2 |
|---|---|---|---|---|---|---|
| 5000 Hz | (dB) | 37.169 | 37.394 | 37.586 | 36.713 | 36.257 |
| 6300 Hz | (dB) | 35.966 | 36.348 | 36.500 | 35.414 | 34.742 |
| 8000 Hz | (dB) | 23.042 | 25.917 | 26.070 | 20.244 | 12.511 |
| 10000 Hz | (dB) | 26.894 | 28.652 | 31.810 | 23.213 | 23.260 |
| Increase of sound transmission loss | | | | | | |
| 100 Hz | (dB) | 0.5330 | 0.6199 | 0.7964 | 0.2341 | — |
| 125 Hz | (dB) | 0.5745 | 0.6679 | 0.8571 | 0.2528 | — |
| 160 Hz | (dB) | 0.6117 | 0.7108 | 0.9112 | 0.2697 | — |
| 200 Hz | (dB) | 0.6375 | 0.7404 | 0.9485 | 0.2814 | — |
| 250 Hz | (dB) | 0.6565 | 0.7623 | 0.9759 | 0.2901 | — |
| 315 Hz | (dB) | 0.6704 | 0.7784 | 0.9960 | 0.2966 | — |
| 400 Hz | (dB) | 0.6803 | 0.7899 | 1.0102 | 0.3012 | — |
| 500 Hz | (dB) | 0.6867 | 0.7974 | 1.0193 | 0.3043 | — |
| 630 Hz | (dB) | 0.6915 | 0.8033 | 1.0262 | 0.3067 | — |
| 800 Hz | (dB) | 0.6955 | 0.8083 | 1.0318 | 0.3088 | — |
| 1000 Hz | (dB) | 0.6991 | 0.8132 | 1.0368 | 0.3109 | — |
| 1250 Hz | (dB) | 0.7032 | 0.8192 | 1.0426 | 0.3135 | — |
| 1600 Hz | (dB) | 0.7097 | 0.8288 | 1.0515 | 0.3178 | — |
| 2000Hz | (dB) | 0.7187 | 0.8425 | 1.0639 | 0.3238 | — |
| 2500 Hz | (dB) | 0.7331 | 0.8646 | 1.0839 | 0.3337 | — |
| 3150 Hz | (dB) | 0.7589 | 0.9041 | 1.1193 | 0.3513 | — |
| 4000 Hz | (dB) | 0.8095 | 0.9815 | 1.1889 | 0.3860 | — |
| 5000 Hz | (dB) | 0.9113 | 1.1364 | 1.3288 | 0.4561 | — |
| 6300 Hz | (dB) | 1.2236 | 1.6056 | 1.7576 | 0.6724 | — |
| 8000 Hz | (dB) | 10.5315 | 13.4060 | 13.5592 | 7.7333 | — |
| 10000 Hz | (dB) | 3.6338 | 5.3916 | 8.5499 | −0.0477 | — |
| Total value of increases | (dB) | 27.870 | 35.072 | 42.355 | 13.997 | — |
| Judgment of sound insulation effect | | BB | AA | AA | DD | — |

TABLE 4

| | | | | Example 4 | Example 5 | Example 6 | Example 7 | Example 8 |
|---|---|---|---|---|---|---|---|---|
| Resin composition | Block copolymer (I) | (I-N-1) | (mass parts) | 70 | 70 | | 30 | |
| | | (I-N-2) | (mass parts) | | | 70 | | 30 |
| | Olefin-based polymer (II) | (II-1) ULTRASEN 640 | (mass parts) | | | | | |
| | | (II-2) ESPRENE 501A | (mass parts) | 30 | 30 | 30 | 70 | 70 |
| | Crosslinking agent (III) | PERKADOX 14/40 | (mass parts) | 0.2 | 0.2 | 0.4 | 0.7 | 0.7 |
| | Foaming agent (1V) | (IV-1) CELLMIC CAP-500 | (mass parts) | | | | | |
| | | (IV-2) VP#35N | (mass parts) | 5 | 5 | 7 | 5.5 | 5.5 |
| Other additives | Filler | Heavy calcium carbonate | (mass parts) | 30 | 30 | 30 | 30 | 30 |
| | Processing aid | Stearic acid PLATAK | (mass parts) | 2 | 2 | 2 | 2 | 2 |
| | Plasticizer | SANSOCIZER DOP | (mass parts) | | | | | |
| | | DAIANA PROCESS OIL PW-380 | (mass parts) | 10 | 10 | 10 | 10 | 10 |
| | Open-cell foaming agent | CQ-50 | (mass parts) | 15 | | 15 | 15 | 15 |
| Properties/ physical properties | Apparent density | | (kg/m3) | 189 | 168 | 172 | 220 | 220 |
| Impedance test | | | | | | | | |
| | Width of test piece | | (mm) | 5.0 | 5.0 | 5.0 | 5.0 | 5.0 |
| | Height of test piece | | (mm) | 5.0 | 5.0 | 5.0 | 5.0 | 6.5 |
| | Length of test piece | | (mm) | 300 | 300 | 300 | 300 | 300 |
| | Frequency $f_{res,3}$ | | (Hz) | 1224.844 | 1217.891 | 1219.063 | 1203.438 | 1195.781 |
| | Loss factor $\eta 3$ | | (—) | 5.758E-03 | 6.525E-03 | 4.477E-03 | 2.712E-03 | 2.984E-03 |
| | Surface density of glass sheet having test piece installed therein | | (kg/m²) | 4.780 | 4.766 | 4.863 | 4.908 | 4.952 |
| Sound transmission loss | | | | | | | | |
| | 100 Hz | | (dB) | 7.814 | 7.795 | 7.929 | 7.993 | 8.052 |
| | 125 Hz | | (dB) | 9.366 | 9.345 | 9.490 | 9.558 | 9.621 |
| | 160 Hz | | (dB) | 11.201 | 11.180 | 11.333 | 11.405 | 11.473 |
| | 200 Hz | | (dB) | 12.945 | 12.922 | 13.082 | 13.157 | 13.228 |

TABLE 4-continued

|  |  | Example 4 | Example 5 | Example 6 | Example 7 | Example 8 |
|---|---|---|---|---|---|---|
| 250 Hz | (dB) | 14.748 | 14.725 | 14.889 | 14.966 | 15.039 |
| 315 Hz | (dB) | 16.660 | 16.636 | 16.803 | 16.882 | 16.956 |
| 400 Hz | (dB) | 18.666 | 18.642 | 18.812 | 18.892 | 18.967 |
| 500 Hz | (dB) | 20.557 | 20.533 | 20.704 | 20.785 | 20.861 |
| 630 Hz | (dB) | 22.523 | 22.499 | 22.671 | 22.753 | 22.829 |
| 800 Hz | (dB) | 24.554 | 24.530 | 24.703 | 24.785 | 24.862 |
| 1000 Hz | (dB) | 26.441 | 26.418 | 26.591 | 26.675 | 26.752 |
| 1250 Hz | (dB) | 28.308 | 28.285 | 28.458 | 28.544 | 28.622 |
| 1600 Hz | (dB) | 30.330 | 30.309 | 30.482 | 30.571 | 30.651 |
| 2000Hz | (dB) | 32.094 | 32.074 | 32.247 | 32.341 | 32.423 |
| 2500 Hz | (dB) | 33.753 | 33.737 | 33.909 | 34.010 | 34.096 |
| 3150 Hz | (dB) | 35.285 | 35.275 | 35.446 | 35.561 | 35.653 |
| 4000 Hz | (dB) | 36.504 | 36.506 | 36.675 | 36.816 | 36.921 |
| 5000 Hz | (dB) | 36.974 | 37.000 | 37.165 | 37.358 | 37.488 |
| 6300 Hz | (dB) | 35.762 | 35.859 | 36.012 | 36.356 | 36.558 |
| 8000 Hz | (dB) | 22.625 | 23.943 | 23.851 | 26.309 | 27.328 |
| 10000 Hz | (dB) | 25.877 | 26.006 | 25.182 | 23.679 | 23.699 |
| Increase of sound transmission loss |  |  |  |  |  |  |
| 100 Hz | (dB) | 0.3868 | 0.3677 | 0.5021 | 0.5652 | 0.6247 |
| 125 Hz | (dB) | 0.4173 | 0.3968 | 0.5413 | 0.6092 | 0.6731 |
| 160 Hz | (dB) | 0.4448 | 0.4230 | 0.5765 | 0.6486 | 0.7163 |
| 200 Hz | (dB) | 0.4638 | 0.4411 | 0.6008 | 0.6758 | 0.7462 |
| 250 Hz | (dB) | 0.4779 | 0.4546 | 0.6189 | 0.6959 | 0.7683 |
| 315 Hz | (dB) | 0.4883 | 0.4645 | 0.6321 | 0.7108 | 0.7846 |
| 400 Hz | (dB) | 0.4957 | 0.4717 | 0.6416 | 0.7215 | 0.7963 |
| 500 Hz | (dB) | 0.5006 | 0.4785 | 0.6477 | 0.7285 | 0.8041 |
| 630 Hz | (dB) | 0.5043 | 0.4803 | 0.6524 | 0.7341 | 0.8102 |
| 800 Hz | (dB) | 0.5076 | 0.4838 | 0.6565 | 0.7392 | 0.8159 |
| 1000 Hz | (dB) | 0.5107 | 0.4873 | 0.6603 | 0.7442 | 0.8216 |
| 1250 Hz | (dB) | 0.5145 | 0.4919 | 0.6650 | 0.7506 | 0.8290 |
| 1600 Hz | (dB) | 0.5206 | 0.4993 | 0.6723 | 0.7611 | 0.8410 |
| 2000Hz | (dB) | 0.5292 | 0.5100 | 0.6828 | 0.7761 | 0.8583 |
| 2500 Hz | (dB) | 0.5433 | 0.5274 | 0.6997 | 0.8006 | 0.8864 |
| 3150 Hz | (dB) | 0.5683 | 0.5585 | 0.7298 | 0.8442 | 0.9366 |
| 4000 Hz | (dB) | 0.6175 | 0.6197 | 0.7889 | 0.9297 | 1.0347 |
| 5000 Hz | (dB) | 0.7165 | 0.7424 | 0.9076 | 1.1004 | 1.2304 |
| 6300 Hz | (dB) | 1.0203 | 1.1168 | 1.2697 | 1.6143 | 1.8156 |
| 8000 Hz | (dB) | 10.1137 | 11.4325 | 11.3396 | 13.7977 | 14.8174 |
| 10000 Hz | (dB) | 2.6171 | 2.7453 | 1.9221 | 0.4187 | 0.4384 |
| Total value of increases | (dB) | 22.959 | 24.191 | 26.408 | 29.367 | 32.049 |
| Judgment of sound insulation effect |  | BB | BB | BB | BB | AA |

As shown in Tables 3 and 4, as compared with the measurement of Reference Example 1 using the commercially available dam rubber as the test piece and Reference Example 2 using the glass sheet not having the dam rubber installed therein, the loss factor in the impedance test of the test piece using each of the foam molded bodies of Examples 1 to 8 is large, so that it could be confirmed that the foam molded bodies of Examples 1 to 8 have excellent damping properties. In addition, as compared with the case using the commercially available dam rubber of Reference Example 1, in the case of using the foam molded bodies of Examples 1 to 8, the sound insulation properties were excellent.

As shown in FIGS. 5 to 7, at the frequency at which the sound transmission loss (STL) is lowered due to the coincidence effect (namely, a phenomenon in which bending vibration of a rigid material, such as a glass, and vibration of incident sonic waves coincidentally cause a resonant state) (in the case of the present Examples, the frequency range of from 5,000 to 10,000 Hz), as compared with the case of using the commercially available dam rubber of Reference Example 1, in the case of using the foam molded bodies of Examples 1 o 8, the increase of sound transmission loss is large, so that the sound transmission loss could be increased.

[Production Example 3] Production of Block Copolymer (I-H-1)

A dry nitrogen-purged pressure-resistant container was charged with 0.930 kg of styrene and 50.0 kg of cyclohexane as a solvent. To this solution, 69.7 g of sec-butyllithium (10% by mass cyclohexane solution) as an initiator was added, and the contents were polymerized at 60° C. for 1 hour. Subsequently, to this reaction mixture, 288 g of tetrahydrofuran as a Lewis base was added, 6.97 kg of isoprene was then added and polymerized for 2 hours, and 0.930 kg of styrene was further added and polymerized for 1 hour, thereby obtaining a reaction liquid containing a polystyrene-polyisoprene-polystyrene triblock copolymer.

To the reaction liquid, a Ziegler-based hydrogenation catalyst formed of nickel octylate and trimethylaluminum was added in a hydrogen atmosphere, and reaction was performed under a condition at a hydrogen pressure of 1 MPa and 80° C. for 5 hours. After standing the reaction liquid for cooling and pressure discharge, the aforementioned catalyst was removed by water washing, and the residue was dried in vacuo, thereby obtaining a hydrogenation product of the polystyrene-polyisoprene-polystyrene triblock copolymer (I-H-1). The analysis results of the hydrogenated block copolymer (I-H-1) are shown in Table 5.

[Production Example 4] Production of Block Copolymer (I-H-2)

A dry nitrogen-purged pressure-resistant container was charged with 0.264 kg of styrene and 50.0 kg of cyclohexane as a solvent. To this solution, 43.3 g of sec-butyllithium (10% by mass cyclohexane solution) as an initiator was added, and the contents were polymerized at 60° C. for 1 hour. Subsequently, to this reaction mixture, 288 g of tetrahydrofuran as a Lewis base was added, a mixture of 3.82 kg of isoprene and 3.94 kg of butadiene was then added and polymerized for 2 hours, and 0.793 kg of styrene was further added and polymerized for 1 hour, thereby obtaining a reaction liquid containing a polystyrene-poly(isoprene/butadiene)-polystyrene triblock copolymer.

To the reaction liquid, a Ziegler-based hydrogenation catalyst formed of nickel octylate and trimethylaluminum was added in a hydrogen atmosphere, and reaction was performed under a condition at a hydrogen pressure of 1 MPa and 80° C. for 5 hours. After standing the reaction liquid for cooling and pressure discharge, the aforementioned catalyst was removed by water washing, and the residue was dried in vacuo, thereby obtaining a hydrogenation product of the polystyrene-poly(isoprene/butadiene)-polystyrene triblock copolymer (I-H-2). The analysis results of the hydrogenated block copolymer (I-H-2) are shown in Table 5.

[Production Example 5] Production of Styrene-Isoprene-Styrene Block Copolymer (SIS)

A dry nitrogen-purged pressure-resistant container was charged with 1.25 kg of styrene and 50.0 kg of cyclohexane as a solvent. To this solution, 55.6 g of sec-butyllithium (10% by mass cyclohexane solution) as an initiator was added, and the contents were polymerized at 60° C. for 1 hour. Subsequently, 7.50 kg of isoprene was added and polymerized for 2 hours, and 1.25 kg of styrene was further added and polymerized for 1 hour. Methanol was poured into the resulting reaction liquid, to obtain a block copolymer (SIS) that is a polystyrene-polyisoprene-polystyrene triblock copolymer. The analysis results of the block copolymer (SIS) are shown in Table 5.

TABLE 5

| | | Production Example 3 (I-H-1) | Production Example 4 (I-H-2) | Production Example 5 SIS |
|---|---|---|---|---|
| Use amount (kg) | Cyclohexane | 50.0 | 50.0 | 50.0 |
| | sec-Butyllithium (10% by mass cyclohexane solution) | 0.0697 | 0.0433 | 0.0556 |
| | Tetrahydrofuran | 0.288 | 0.288 | — |
| | Styrene (A1) | 0.930 | 0.264 | 1.25 |
| | Styrene (A2) | 0.930 | 0.793 | 1.25 |
| | Isoprene | 6.97 | 3.82 | 7.50 |
| | Butadiene | — | 3.94 | — |
| Physical properties | Polymer block sequence | A1-B-A2 | A1-B-A2 | A1-B-A2 |
| | Peak top molecular weight (Mp) | 107,000 | 165,000 | 150,000 |
| | Mp(A1) | 8,100 | 3,700 | 13,700 |
| | Mp(A2) | 8,100 | 11,100 | 13,700 |
| | Mp(A1)/Mp(A2) | 1 | 1/3 | 1 |
| | Weight average molecular weight (Mw) | 103,000 | 163,000 | 148,000 |
| | Number average molecular weight (Mn) | 99,500 | 160,000 | 145,000 |
| | Molecular weight distribution (Mw/Mn) | 1.04 | 1.02 | 1.02 |
| | Content of polymer block (A) (% by mass) | 21.0 | 12.0 | 25.0 |
| | Content of polymer block (B) (% by mass) | 79.0 | 88.0 | 75.0 |
| | Hydrogenation rate (mol %) | 89 | 92 | 0 |
| | Vinyl bond content of polymer block (B) (mol %) | 61.0 | 62.0 | 7.5 |
| | Peak top temperature of tanδ (° C.) | −4.5 | −21.0 | −52.9 |
| | Peak intensity of tanδ | 2.20 | 2.20 | 2.37 |
| | Glass transition temperature (° C.) | −15 | −32 | −59 |
| | Average methylene chain length in polymer block (B) | 1.8 | 2.3 | 2.9 |

Examples 9 to 12

The block copolymer (I), the olefin-based polymer (II-2), the filler, the processing aid, and the plasticizer were melt mixed in a proportion of the blending composition shown in Table 6 at a temperature of 140° C. by using a kneader, thereby obtaining a master batch.

Subsequently, to the obtained master batch, the crosslinking agent (III) and the foaming agent (IV-2) were added in a proportion of the blending composition shown in Table 6 and roll kneaded at a roll temperature of 115° C., thereby obtaining a composition. The obtained composition was subjected to a press treatment at 170° C. for 12 minutes by using a die having a thickness of 10 mm, thereby obtaining a foam molded body.

Using the obtained foam molded body, test pieces having a size described in Table 6 were cut out and measured for the apparent density by the aforementioned method. In addition, using each of the test pieces, a laminated structure was produced according to the production of a laminated structure composed of steel sheet/foam molded body/glass as mentioned below, and then subjected to a mechanical impedance test. The results are shown in Table 6.

Examples 13 to 16

The block copolymer (I), the olefin-based polymer (II-2), the crosslinking agent (III), the foaming agent (IV-2), the filler, the processing aid, and the plasticizer were roll kneaded in a proportion of the blending composition shown in Table 6 at a temperature of 126° C. by using a roll kneading machine, thereby obtaining a composition. The obtained composition was subjected to a press treatment at 170° C. for 10 minutes by using a die having a thickness of 10 mm, thereby obtaining a foam molded body.

Using the obtained foam molded body, test pieces having a size described in Table 6 were cut out and measured for the apparent density by the aforementioned method. In addition, using each of the test pieces, a laminated structure was produced according to the production of a laminated structure composed of steel sheet/foam molded body/glass as mentioned below, and then subjected to a mechanical impedance test. The results are shown in Table 6.

Comparative Example 1

The olefin-based polymer (II-2), the crosslinking agent (III), the foaming agent (IV-2), the filler, the processing aid, and the plasticizer were roll kneaded in a proportion of the blending composition shown in Table 6 at a temperature of 126° C. by using a roll kneading machine, thereby obtaining a composition. The obtained composition was subjected to a press treatment at 170° C. for 10 minutes by using a the having a thickness of 10 mm, thereby obtaining a foam molded body.

Using the obtained foam molded body, a test piece having a size described in Table 6 was cut out and measured for the apparent density by the aforementioned method. In addition, using the test piece, a laminated structure was produced according to the production of a laminated structure composed of steel sheet/foam molded body/glass as mentioned below, and then subjected to a mechanical impedance test. The results are shown in Table 6.

Comparative Example 2

The SIS synthesized in Production Example 5, the olefin-based polymer (II-2), the crosslinking agent (III), the foaming agent (IV-2), the filler, the processing aid, and the plasticizer were roll kneaded in a proportion of the blending composition shown in Table 6 at a temperature of 126° C. by using a roll kneading machine, thereby obtaining a composition. The obtained composition was subjected to a press treatment at 170° C. for 10 minutes by using a die having a thickness of 10 mm, thereby obtaining a foam molded body.

Using the obtained foam molded body, a test piece having a size described in Table 6 was cut out and measured for the apparent density by the aforementioned method. In addition, using the test piece, a laminated structure was produced according to the production of a laminated structure composed of steel sheet/foam molded body/glass as mentioned below, and then subjected to a mechanical impedance test. The results are shown in Table 6.

[Production of Laminated Structure Composed of Steel Sheet/Foamed Molded Body/Glass]

Figure 8:
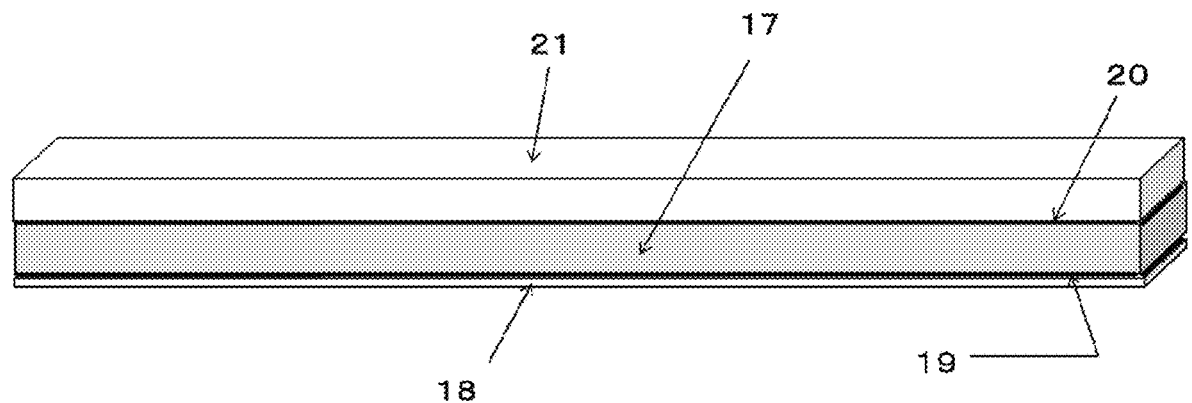
FIG. 8 is a view showing an outline of a laminated structure of each of Examples 9 to 16 and Comparative Examples 1 to 2.

As shown in FIG. 8, an electrolytic zinc-coated steel sheet (SECC) 18 of 10 mm in width×0.8 mm in thickness×250 mm in length was installed on one surface of a test piece 17 which had been cut out from the foam molded body via a double-sided tape 19 (VR-5311, manufactured by Nitto Denko Corporation); and subsequently, a laminated glass or single-sheet glass 21 was installed on the other surface of the test piece 17 via a double-sided tape 20 (VR-5311, manufactured by Nitto Denko Corporation), to obtain a laminated structure composed of steel sheet/foam molded body/glass, which was then subjected to the following mechanical impedance test.

As for the laminated glass used at the time of preparing the laminated structure, a laminated glass having a three-layer structure of glass/intermediate film/glass, which was prepared by sandwiching an intermediate film for laminated glass (TROSIFOL CLEAR, manufactured by Kuraray Co., Ltd.) by two sheets of commercially available clear glasses [FL2 (four-side beveling processed), 250 mm in length×10 mm in width×2 mm in thickness, manufactured by East Japan Glass K.K.] and treating with a vacuum laminator ("1522N", manufactured by Nisshinbo Mechatronics Inc.) under a condition at a hot plate temperature of 120° C. for an evacuation time of 20 minutes at a pressing pressure of 30 kPa for a pressing time of 10 minutes, was used. In addition, as for the single-sheet glass used at the time of preparing the laminated structure, a commercially available clear glass [FL4 (four-side beveling processed), 250 mm in length×10 mm in width×4 mm in thickness, manufactured by East Japan Glass K.K.] was used. The kinds of the glasses used in the respective Examples and Comparative Examples are shown in Table 6.

[Mechanical Impedance Test]

A tip portion of an exciting force detector built in an impedance head of an exciter (power amplifier/model 371-A) of a mechanical impedance instrument (manufactured by Ono Sokki Co., Ltd., mass cancel amplifier: MA-5500, channel data station: DS-2100) was fixed to a central portion on the steel sheet side (the surface on which the foam molded body was not installed). A vibration was given to the aforementioned central portion at a frequency in the range of from 0 to 8,000 Hz. An exciting force and an acceleration waveform at this point were detected, thereby performing a damping test by the central exciting method. The damping test was performed under a temperature condition at 20° C. or 40° C. A mechanical impedance at an exciting point was determined on the basis of the obtained exciting force and a speed signal obtained by integrating an acceleration signal, and an impedance curve was obtained by setting the frequency on the abscissa and the mechanical impedance on the ordinate, respectively. A loss factor ($\eta_2$) of the aforementioned laminate was determined from a frequency ($f_{res,2}$) of a second peak (2nd mode) counted from the low frequency side of the obtained impedance curve and a half value width.

TABLE 6

| | | | Example 9 | Example 10 | Example 11 | Example 12 | Example 13 | Example 14 | Example 15 | Example 16 | Comparative Example 1 | Comparative Example 2 |
|---|---|---|---|---|---|---|---|---|---|---|---|---|
| Resin composition | Block copolymer (I) | (I-N-1) | (mass parts) | 70 | | | | | | | | | |
| | | (I-N-2) | (mass parts) | | 70 | | | | | | | | |
| | | (I-H-1) | (mass parts) | | | 30 | 30 | 50 | | | | | |
| | | (I-H-2) | (mass parts) | | | | | | 50 | | 35 | | 70 |
| | Block copolymer (II) | SIS | (mass parts) | | | | | | | 50 | 35 | | |
| | | (II-2) ESPRENE 501A | (mass parts) | 30 | 30 | 70 | 70 | 50 | 50 | 50 | 30 | 100 | 30 |
| | Crosslinking agent (III) | PERKADOX 14/40 | (mass parts) | 0.2 | 0.4 | 0.7 | 0.7 | 0.5 | 0.6 | 0.6 | 0.4 | 0.9 | 0.6 |
| | Foaming agent (IV) | (IV-2) VP#35N | (mass parts) | 5 | 7 | 5.5 | 5.5 | 5 | 5.2 | 5.2 | 7 | 6 | 7 |
| | Other Filler | Heavy calcium carbonate | (mass parts) | 30 | 30 | 30 | 30 | 30 | 30 | 30 | 30 | 30 | 30 |
| | additives Processing aid | PLATAK | (mass parts) | 2 | 2 | 2 | 2 | 2 | 2 | 2 | 2 | 2 | 2 |
| | Plasticizer | DAIANA PROCESS OIL PW-380 | (mass parts) | 10 | 10 | 10 | 10 | 10 | 10 | 10 | 10 | 10 | 10 |
| Structure of laminated structure | Width of test piece of foam molded body | | (mm) | 10.0 | 10.0 | 10.0 | 10.0 | 10.0 | 10.0 | 10.0 | 10.0 | 10.0 | 10.0 |
| | Height of test piece of foam molded body | | (mm) | 5.3 | 5.0 | 2.7 | 2.7 | 4.0 | 4.7 | 4.9 | 5.3 | 4.2 | 5.8 |
| | Length of test piece of foam molded body | | (mm) | 250 | 250 | 250 | 250 | 250 | 250 | 250 | 250 | 250 | 250 |
| | Kind of glass | | | Laminated glass | Laminated glass | Laminated glass | Single-sheet glass | Laminated glass | Laminated glass | Laminated glass | Laminated glass | Laminated glass | Laminated glass |
| | Weight of laminated structure of steel sheet/foam molded body/glass | | (g) | 41.50 | 41.80 | 42.10 | 41.40 | 41.44 | 41.95 | 41.40 | 41.73 | 41.74 | 41.19 |
| Properties/ physical properties | Apparent density of test piece of foam molded body | | (kg/m³) | 168 | 164 | 221 | 221 | 199 | 193 | 188 | 156 | 209 | 158 |
| | Mechanical impedance test | Frequency $f_{res,2}$ 20° C. | (Hz) | 869 | 515 | 763 | 845 | 851 | 436 | 385 | 575 | 441 | 399 |
| | | 40° C. | (Hz) | 480 | 396 | 579 | 709 | 509 | 368 | 354 | 375 | 416 | 370 |
| | | Loss factor $\eta_2$ 20° C. | (—) | 0.28 | 0.40 | 0.11 | 0.082 | 0.18 | 0.23 | 0.10 | 0.41 | 0.056 | 0.057 |
| | | 40° C. | (—) | 0.40 | 0.21 | 0.25 | 0.19 | 0.39 | 0.17 | 0.13 | 0.24 | 0.11 | 0.11 |

As shown in Table 6, as compared with Comparative Examples 1 and 2 each using the foam molded body not containing the block copolymer (I), in the case of using the foam molded bodies of Examples 9 to 16, the loss factor in the mechanical impedance test is large, so that it could be confirmed that the foam molded bodies of Examples 9 to 16 have excellent damping properties. In addition, in comparison between Examples 11 and 12, the laminated structure using the laminated glass is larger in the loss factor, so that it could be confirmed that the foregoing laminated structure is more excellent in the damping properties and sound insulation properties.

INDUSTRIAL APPLICABILITY

The foam molded body of the present invention is able to improve the damping properties and sound insulation properties of a panel and realize the weight reduction of a panel, and therefore, it is useful as a dam rubber and a complex of a dam rubber and a panel. In addition, by using the foam molded body of the present invention, a method for increasing the sound transmission loss can be provided.

REFERENCE SIGNS LIST

1: Dam rubber, 2: panel, 3: window frame, 4: body, 5: chenille, 6: sealant, 10: complex of dam rubber and panel, 11: dam rubber, 12: panel, 13: resin frame body, 14: test piece cut out from foam molded body, 15: glass sheet, 16: pressure sensitive adhesive double coated tape, 17: test piece cut out from foam molded body, 18: electrolytic zinc-coated steel sheet, 19: double-sided tape, 20: pressure sensitive adhesive double coated tape, 21: laminated glass or single-sheet glass, b: release paper

The invention claimed is:

1. A foam molded body of a resin composition comprising:
a block copolymer (I) consisting of at least one polymer block (A) consisting of a structural unit derived from an aromatic vinyl compound and at least one polymer block (B) consisting of a structural unit derived from at least one selected from the group consisting of isobutylene, butadiene, and a mixture of isoprene and butadiene, wherein a hydrogenation rate of the carbon-carbon double bond in a total of the polymer block (B) is from 0 mol% to 3 mol% or 70 mol% or more, and wherein the block copolymer (I) exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000,
at least one olefin-based polymer (II) selected from the group consisting of an ethylene-propylene-diene copolymer rubber, an ethylene-vinyl acetate copolymer, and a polyethylene-based resin,
a crosslinking agent (III), and
a foaming agent (IV).

2. The foam molded body according to claim 1, wherein the polymer block (B) has a total content of a 3,4-bond unit and a 1,2-bond unit of 20 mol% or more.

3. The foam molded body according to claim 1, wherein the polymer block (B) consists of a structural unit derived from at least one selected from the group consisting of butadiene and a mixture of isoprene and butadiene.

4. The foam molded body according to claim 1, wherein when the polymer block (B) is regarded as having a structure with a hydrogenation rate of 100 mol%, an average value of a methylene chain length of a main chain of a structural unit derived from at least one selected from the group consisting of a conjugated diene compound and isobutylene is from 1.0 to 6.0.

5. The foam molded body according to claim 2, wherein when the polymer block (B) is regarded as having a structure with a hydrogenation rate of 100 mol%, an average value of a methylene chain length of a main chain of a structural unit derived from a conjugated diene compound is from 1.0 to 6.0.

6. The foam molded body according to claim 1, wherein the hydrogenation rate of the carbon-carbon double bond in the total of the polymer block (B) is 70 mol% or more.

7. A dam rubber comprising the foam molded body according to claim 1.

8. The dam rubber according to claim 7, which is suitable for use for transportation equipment or building.

9. A complex, comprising:
a dam rubber comprising a foam molded body; and
a panel,
wherein the foam molded body comprises:
a block copolymer (I) having a polymer block (A) composed mainly of a structural unit derived from an aromatic vinyl compound and other polymer block (B), exhibits a peak top temperature of tan δ as measured under a condition of a thickness of a test piece of 1 mm, a strain amount of 0.1%, a frequency of 1 Hz, a measurement temperature of −70 to 70° C., and a temperature rise rate of 3° C./min in conformity with JIS K7244-10 (2005), of −50 to 50° C., and has a peak top molecular weight, as determined in terms of standard polystyrene by gel permeation chromatography, of 30,000 to 500,000,
at least one olefin-based polymer (II) selected from the group consisting of an ethylene-propylene-diene copolymer rubber, an ethylene-vinyl acetate copolymer, and a polyethylene-based resin,
a crosslinking agent (III), and
a foaming agent (IV).

10. The complex according to claim 9, wherein the panel is made of a glass, a metal, or a plastic.

11. A method for increasing a sound transmission loss comprising:
installing a foam molded body in a panel, wherein the foam molded body is molded from a resin composition comprising:
a block copolymer (I) consisting of at least one polymer block (A) consisting of a structural unit derived from an aromatic vinyl compound and at least one polymer block (B) consisting of a structural unit derived from at least one selected from the group consisting of isobutylene, butadiene, and a mixture of isoprene and butadiene, wherein a hydrogenation rate of the carbon-carbon double bond in a total of the polymer block (B) is from 0 mol% to 3 mol% or 70 mol% or more, and wherein the block copolymer (I) exhibits a peak top temperature of tan δ, as measured under a condition of a thickness of a test piece of 1 mm, a strain amount of 0.1%, a frequency of 1 Hz, a measurement temperature of −70 to 70° C., and a temperature rise rate of 3° C/min in conformity with JIS K7244-10 (2005), of −50 to 50° C., and has a peak top molecular weight, as determined in terms of standard polystyrene by gel permeation chromatography, of 30,000 to 500,000, at least one olefin-based polymer (II) selected from the group consisting of an ethylene-propylene-diene copolymer rubber, an ethylene-vinyl acetate copolymer, and a polyethylene-based resin, a crosslinking agent (III), and a foaming agent (IV).

12. The foam molded body according to claim 1, wherein the hydrogenation rate of the carbon-carbon double bond in the total of the polymer block (B) is from 0 mol% to 3 mol%.

13. The foam molded body according to claim 1, wherein the polymer block (B) consists of a structural unit derived from isobutylene.

14. The foam molded body according to claim 1, wherein the polymer block (B) consists of a structural unit derived from butadiene.

15. The foam molded body according to claim 1, wherein the polymer block (B) consists of a structural unit derived from a mixture of isoprene and butadiene.

* * * * *